(12) United States Patent
Lee et al.

(10) Patent No.: US 7,675,733 B2
(45) Date of Patent: Mar. 9, 2010

(54) MULTILAYER CAPACITOR

(75) Inventors: Byoung Hwa Lee, Gyunggi-do (KR); Sung Kwon Wi, Seoul (KR); Sang Soo Park, Gyunggi-do (KR); Min Cheol Park, Gyunggi-do (KR); Dong Seok Park, Seoul (KR); Hae Suk Chung, Seoul (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 12/237,837

(22) Filed: Sep. 25, 2008

(65) Prior Publication Data

US 2009/0086403 A1   Apr. 2, 2009

(30) Foreign Application Priority Data

Sep. 28, 2007   (KR) .............. 10-2007-0098300

(51) Int. Cl.
*H01G 4/228* (2006.01)
(52) U.S. Cl. ............ 361/306.3; 361/306.1; 361/303; 361/308.1; 361/311; 361/321.2
(58) Field of Classification Search ............ 361/306.3, 361/306.1, 303–305, 307, 308.1, 309, 311–313, 361/321.1, 321.2
See application file for complete search history.

(56) References Cited

U.S. PATENT DOCUMENTS

| | | | |
|---|---|---|---|
| 6,381,117 B1 * | 4/2002 | Nakagawa et al. | 361/306.3 |
| 6,542,352 B1 * | 4/2003 | Devoe et al. | 361/321.2 |
| 6,606,237 B1 * | 8/2003 | Naito et al. | 361/306.3 |
| 6,765,781 B2 | 7/2004 | Togashi | |
| 7,054,136 B2 * | 5/2006 | Ritter et al. | 361/309 |
| 7,088,569 B1 | 8/2006 | Togashi et al. | |
| 7,149,071 B2 * | 12/2006 | Mosley | 361/306.3 |
| 7,158,364 B2 * | 1/2007 | Miyauchi et al. | 361/303 |
| 7,310,217 B2 * | 12/2007 | Takashima et al. | 361/306.3 |
| 2006/0152886 A1 | 7/2006 | Togashi et al. | |
| 2006/0164789 A1 | 7/2006 | Togashi et al. | |

FOREIGN PATENT DOCUMENTS

| | | |
|---|---|---|
| JP | 2007-250973 | 9/2007 |
| KR | 10-2006-0082795 | 7/2006 |

OTHER PUBLICATIONS

Korean Office Action issued in Korean Patent Application No. KR 10-2007-0098300, mailed Jan. 21, 2009.

* cited by examiner

*Primary Examiner*—Nguyen T Ha
(74) *Attorney, Agent, or Firm*—McDermott Will & Emery LLP

(57) ABSTRACT

There is provided a multilayer capacitor including an inner connecting conductor of at least one polarity; a plurality of first and second outer electrodes formed on a surface of the body, wherein the inner connecting conductor is connected to a corresponding one of the outer electrodes having identical polarity, a corresponding one of the inner electrodes having identical polarity to the inner connecting conductor includes a plurality of groups each including at least one of the inner electrodes, wherein the inner electrodes of the respective groups are connected to the outer electrodes having identical polarity that are different from one another for each of the groups and electrically connected to the inner connecting conductor through the connected outer electrode.

16 Claims, 14 Drawing Sheets

MULTILAYER CAPACITOR

CROSS-REFERENCE TO RELATED APPLICATIONS

This application claims the priority of Korean Patent Application No. 2007-98300 filed on Sep. 28, 2007 in the Korean Intellectual Property Office, the disclosure of which is incorporated herein by reference.

BACKGROUND OF THE INVENTION

1. Field of the Invention

The present invention relates to a multilayer capacitor, and more particularly, to a decoupling multilayer capacitor in which a user can adjust equivalent series resistance (ESR) directly.

2. Description of the Related Art

In general, a multilayer chip capacitor (MLCC) has a structure such that inner electrodes of different polarities are laminated alternately while interposing a corresponding one of a plurality of dielectric layers. This multilayer chip capacitor can be miniaturized, performing with high capacity and mounted easily, and thus broadly used as parts of various electronic devices.

Notably, a power supply for a central processing unit (CPU) in a computer experiences voltage noise due to rapid change in a load current when supplying a low voltage. Accordingly, the multilayer chip capacitor is widely utilized in the power supply as a decoupling capacitor for suppressing such voltage noise.

The decoupling multilayer chip capacitor is required to have a lower equivalent series inductance (ESL) value with an increase in an operating frequency, and studies for reducing ESL have been vigorously conducted.

Also, in order to supply the power more stably, the decoupling multilayer capacitor should have adjustable ESR characteristics. The multilayer capacitor having ESR lower than a required level increases an impedance peak at a parallel resonant frequency due to the ESL of the capacitor and the plane capacitance of a micro-processor package while extremely lowering impedance at a serial resonant frequency.

Therefore, the decoupling multilayer capacitor may be configured to easily adjust ESR characteristics thereof so that a user can achieve flat impedance characteristics of a power distribution network.

As a method for adjusting ESR, a material with high electrical resistance may be utilized as outer and inner electrodes. Such a change in material advantageously ensures high ESR characteristics, while enabling ESL to be maintained at a low level as in the prior art.

However, the high resistant material, when used for outer electrodes, results in a localized heat spot due to current concentration caused by pin holes. Moreover, the high resistant material, when utilized for inner electrodes, needs to keep changing to match with a ceramic material, which is employed to allow for higher capacity.

As another method for improving ESR, U.S. Pat. No. 6,765,781 whose assignee is TDK, discloses a method of connecting inner electrodes in series to each other through a linkage electrode by disposing the linkage electrode outside the capacitor body.

Yet, this conventional method disadvantageously requires a manufacturer of the capacitor to adjust ESR. That is, the capacitor is designed or manufactured by improving an electrode structure so as to possess desired predetermined ESR according to the user's needs and application conditions. This problem also arises in the method involving a change in materials described above.

Therefore, in the conventional methods for adjusting ESR, the capacitor manufacturer needs to manufacture individual products satisfying various ESR characteristics according to the user's needs and application conditions. Moreover, the capacitor user should inconveniently select an individual product considering necessary ESR conditions.

SUMMARY OF THE INVENTION

An aspect of the present invention provides a multilayer capacitor of a novel structure in which a user can directly adjust ESR characteristics required under the conditions of use.

According to an aspect of the present invention, there is provided a multilayer capacitor including: a capacitor body having a plurality of dielectric layers laminated therein; a plurality of first and second inner electrodes alternately arranged to have different polarities opposing each other, while interposing a corresponding one of the dielectric layers, respectively; an inner connecting conductor of at least one polarity disposed adjacent to a corresponding one of the inner electrodes having opposite polarity, while interposing a corresponding one of the dielectric layers; a plurality of first and second outer electrodes formed on a surface of the body, wherein the inner connecting conductor is connected to a corresponding one of the outer electrodes having identical polarity, a corresponding one of the inner electrodes having identical polarity to the inner connecting conductor includes a plurality of groups each including at least one of the inner electrodes, wherein the inner electrodes of the respective groups are connected to the electrodes having identical polarity that are different from one another for each of the groups and electrically connected to the inner connecting conductor through the connected outer electrode.

The inner connecting conductor may include an inner connecting conductor of both polarities, respectively. That is, the inner connecting conductor of the at lest one polarity may include at least one first and second inner connecting conductors.

Out of the first and second outer electrodes, the outer electrode of at least one polarity may be connected to a corresponding one of the inner connecting conductors having identical polarity and not connected to a corresponding one of the inner electrodes having identical polarity.

The first and second inner electrodes are connected to the outer electrodes of an identical number. Out of the first and second inner electrodes, the inner electrode of at least one polarity may be connected to a plurality of corresponding ones of the outer electrodes having identical polarity.

The inner electrode of at least one of the groups may be additionally connected to the outer electrode having the inner electrode of another one of the groups connected thereto.

To improve ESL characteristics, the first and second outer electrodes may be arranged to have different polarities adjacent to each other.

The first and second outer electrodes may be formed on opposing side surfaces of the body, respectively, and the outer electrodes formed on the opposing side surfaces of the body may include an identical number, respectively. The first and second outer electrodes may be arranged to have different polarities disposed on the opposing side surfaces, respectively to ensure better ESL characteristics.

The body may be of a rectangular parallelepiped structure including opposing first and second main surfaces and four side surfaces disposed therebetween, the first and second outer electrodes may be formed along the four side surfaces and the outer electrodes may be formed on the opposing side surfaces in an identical number, respectively. The first and second outer electrodes may be arranged to have different polarities disposed at corresponding positions on the opposing side surfaces, respectively.

The first and second inner connecting conductors may have an overlapping area corresponding to an overlapping area between the first and second inner electrodes. Here, the inner connecting conductors can serve as a capacitor element similar to the inner electrode.

The multilayer capacitor of the present invention can be beneficially applied to both a conventional structure where the dielectric layers are laminated in a thickness direction and a structure where the dielectric layers are laminated in a width or length direction of the body.

The capacitor body may include first and second surfaces formed in a laminated direction of the plurality of dielectric layers to oppose each other, and side surfaces disposed therebetween, wherein one of the first and second surfaces provides a mounting surface, two of the plurality of first and second outer electrodes are formed on both opposing ones of the side surfaces formed in the laminated direction, respectively and at least another one of the outer electrodes is formed on the first and second surfaces, respectively, the outer electrodes formed on the one of the first and second surfaces as the mounting surface include the first and second outer electrodes formed of at least one pair with the outer electrodes formed on the side surfaces.

The capacitor body may include first and second surfaces formed in a laminated direction of the plurality of dielectric layers to oppose each other, and side surfaces disposed therebetween, wherein one of the first and second surfaces provides a mounting surface, the plurality of first and second outer electrodes include three outer electrodes, respectively, and the outer electrodes of different polarities are formed on the first and second surfaces in an identical number, respectively.

According to another aspect of the present invention, there is provided a multilayer capacitor in which ESR can be adjusted by improving the connection structure of inner electrodes without an additional inner connecting conductor. This multilayer capacitor can be applied to a six or more terminal structure.

The multilayer capacitor includes: a capacitor body having a plurality of dielectric layers laminated therein; a plurality of first and second inner electrodes arranged alternately to have different polarities opposing each other, while interposing a corresponding one of the dielectric layers, respectively; and m number of first and second outer electrodes formed on a surface of the body, where m≧3 wherein the inner electrode of at least one polarity includes a plurality of groups each including at least one of the inner electrodes, and the inner electrode of each of the groups is connected to n number of the outer electrodes, respectively, where 2≦n<m, at least one of the outer electrodes connected to the inner electrode belonging to a respective one of the groups is different from the outer electrodes connected to the inner electrode belonging to another one of the groups, and the inner electrode of one of the groups is commonly connected to the inner electrode connected to the inner electrode of another one of the groups such that the inner electrodes of all of the groups are electrically connected to one another.

This structural improvement can be achieved only in the inner electrode of predetermined polarity, but the first and second inner electrodes of both polarities can be improved in structure.

In the specification, the term "an outer electrode for adjusting ESR" refers to an outer electrode in which a series connection structure of inner electrodes connected thereto is changed according to the direct connection with a power line when mounted to thereby adjust ESR within a predetermined range.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
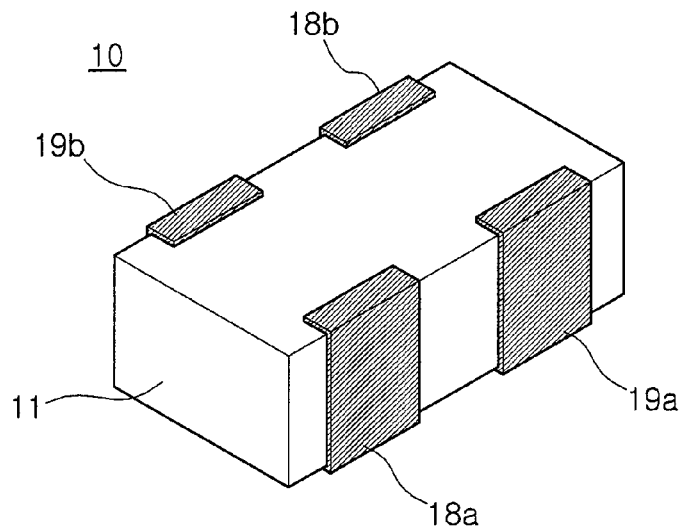
FIG. 1 is a perspective view illustrating a multilayer capacitor according to a first embodiment of the invention.

FIG. 1 illustrates a four-terminal multilayer capacitor according to a first embodiment of the invention.

Referring to FIG. 1, the multilayer capacitor 10 of the present embodiment includes a capacitor body 11 having a plurality of dielectric layers 11' laminated therein.

The multilayer capacitor 10 includes two first outer electrodes 18a and 18b and two second outer electrodes 19a and 19b formed on both opposing side surfaces to be electrically insulated from each other.

The first and second outer electrodes 18a and 18b; 19a and 19b may be arranged such that adjacent ones of the outer electrodes have opposite polarities to each other to reduce equivalent series inductance (ESL). In the present embodiment, the outer electrodes of different polarities are disposed at corresponding positions on the both opposing side surfaces. Accordingly, this allows for a reduction in ESL.

Figure 2:
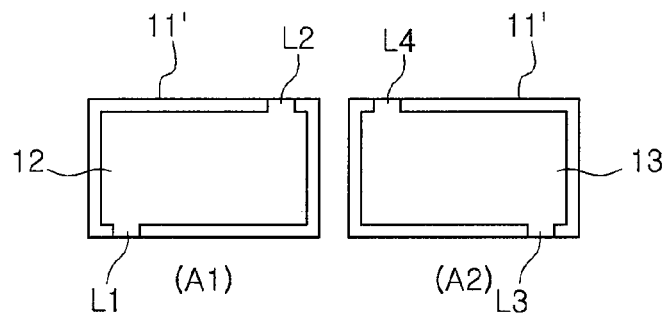
FIG. 2 is a plan view illustrating first and second inner connecting conductors applicable to the multilayer capacitor shown in FIG. 1.
Figure 3:
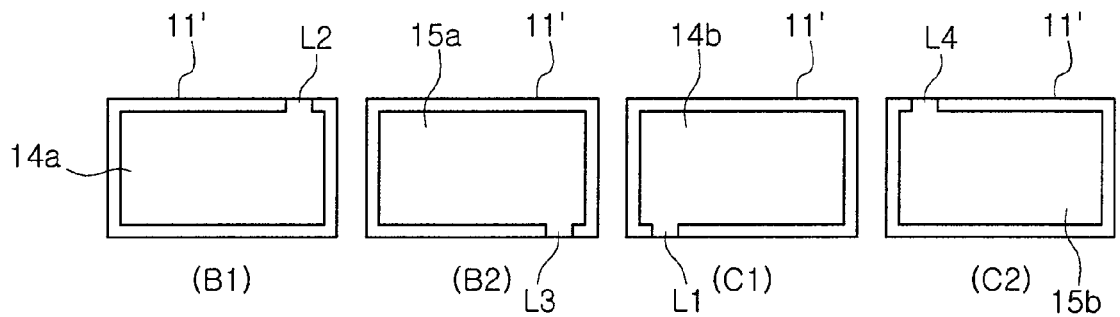
FIG. 3 is a plan view illustrating first and second inner electrodes applicable along with the first and second inner connecting conductors shown in FIG. 2.

As shown in FIGS. 2 and 3, the multilayer capacitor 10 may include first and second inner connecting conductors 12 and 13 and first and second inner electrodes 14a and 14b; 15a and 15b, and a corresponding one of the inner connecting conductors 12 and 13 and the inner electrodes 14a, 14b, 15a and 15b is formed on each of the dielectric layers 11'.

The plurality of first and second inner electrodes 14a, 15a, 14b and 15b and the first and second inner connecting conductors 12 and 13 are arranged such that corresponding ones of the inner electrodes 14a, 15a, 14b and 15b and the inner connecting conductors 12 and 13 having different polarities alternate with each other.

FIG. 2 illustrates one pair of first and second inner connecting conductor 12 and 13 but the inner connecting conductor of at least one polarity may be formed of a plurality pairs.

In a similar manner, FIG. 3 illustrates one pair of first and second inner electrodes of different polarities 14a15a, 14b, and 15b, respectively. However, in actual applications, the inner electrode in a predetermined group B1, B2, C1 or C2 may be formed of a plurality of pairs.

Meanwhile, the inner electrodes and the inner connecting conductors may be laminated according to the order of A1-A2-B1-B2-C1-C2 shown in FIGS. 2 and 3. Alternatively, the inner electrodes and the inner connecting conductors may be laminated in various orders. For example, the inner connecting conductors 12 and 13 may be disposed between the inner electrodes in the order of e.g., B1-B2- . . . -C1-C2-A1-A2-B1-B2- . . . -C1-2. Also, the first and second inner connecting conductors 12 and 13 may be arranged at a distance from each other in the order of e.g., A1-B1-B2- . . . -C1-C2-A2-B1-B2- . . . -C1-C2. Particularly, the inner connecting conductors may be varied in arrangement position to adjust desired ESR characteristics more precisely.

The first inner connecting conductor 12 is connected to the first outer electrodes 18a and 18b through two leads L1 and L2, respectively. Hereinafter, the leads located in the same positions will be denoted with the same reference numerals. Likewise, the second inner connecting conductor 13 is connected to the second outer electrodes 19a and 19b through two leads L3 and L4, respectively.

As described above, the first and second inner connecting conductors 12 and 13 are formed of conductor patterns connected to all of the outer electrodes. But as in the present embodiment, the first and second inner connecting conductors 12 and 13 may have an overlapping area corresponding to an overlapping area between the first and second inner electrodes 14a and 14b; 15a and 15b to serve as a capacitor element similar to the other inner electrodes 14a, 14b, 15a, and 15b.

Meanwhile, the first inner electrodes 14a and 14b of the respective groups are connected to one of the first outer electrodes 18a and 18b that is different from one another for each of the groups, respectively. Also, the second inner electrodes 15a and 15b of the respective groups are connected to one of the second outer electrodes 19a and 19b that is different from one another for the each group, respectively.

That is, as shown in FIG. 3, the first and second inner electrodes 14a, 15a, 14b, and 15b of the respective groups are connected to one of the outer electrodes 18a, 18b, 19a, and 19b that is different from one another for the each group, through one of the leads L1, L2, L3, or L4, respectively.

By virtue of this connection, the first inner electrodes 14*a* and 14*b* of the respective groups are electrically connected to the first inner connecting conductor 12 through the first outer electrodes 18*a* and 18*b* that are different from one another for the each group. Also, such connection allows the second inner electrodes 15*a* and 15*b* of the respective groups to be electrically connected to the second inner connecting conductor 13 through the second outer electrodes 19*a* and 19*b* that are different from one another for the each group.

In the present embodiment, the two outer electrodes except for the one pair of first and second outer electrodes used as an outer terminal for connection with a power line may be construed to be utilized as an outer electrode for adjusting ESR.

However, the first and second outer electrodes used as an outer terminal may be arbitrarily selected to suit desired ESR characteristics. Thus, the outer electrodes for adjusting ESR are not limited. For example, in a case where respective corresponding ones 18*a* and 19*b* of the first and second outer electrodes are utilized as an outer terminal, the other two outer electrodes 18*b* and 19*a* may serve as an outer electrode for adjusting ESR. Alternatively, respective corresponding ones 18*b* and 19*a* of the first and second outer electrodes may be utilized as an outer terminal and the other two outer electrodes 18*a* and 19*b* may serve as an outer electrode for adjusting ESR. Furthermore, in a case where the outer electrodes of an identical number are utilized as an outer terminal, ESR may be finely changed according to a selected one of the outer electrodes.

Figure 4A:
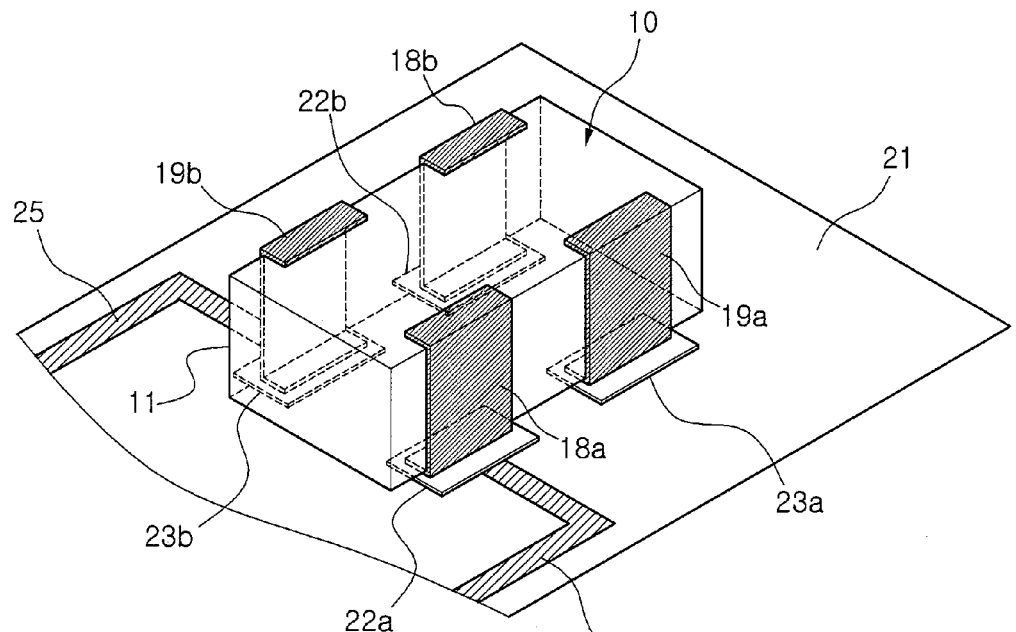
FIGS. 4A and 4B are perspective views illustrating an outer electrode of the multilayer capacitor shown in FIG. 1 connected to a power line of a printed circuit board according to an exemplary embodiment of the invention.
Figure 4B:
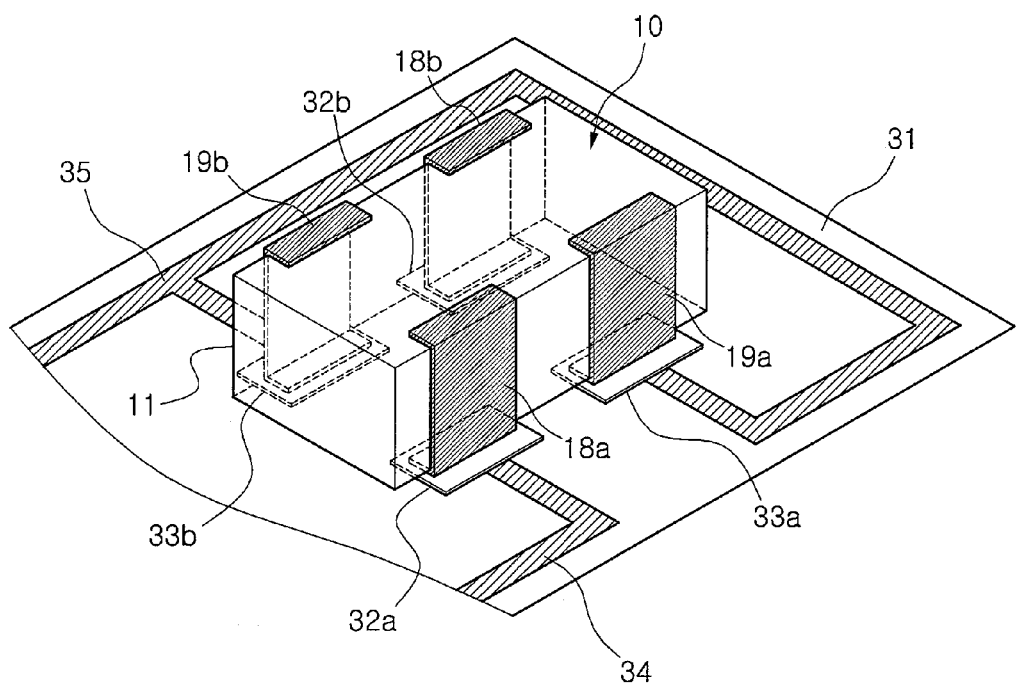

FIGS. 4A and 4B are schematic views for explaining a method of adjusting ESR in the multilayer capacitor according to the first embodiment of the invention.

Referring to FIG. 4A, a printed circuit board 21 has the multilayer capacitor 10 of FIG. 1 mounted thereon. Four mounting pads 22*a*, 22*b*, 23*a*, and 23*b* are provided on the board 21.

The four mounting pads 22*a*, 22*b*, 23*a*, and 23*b* are soldered to be connected to the outer electrodes 18*a*, 18*b*, 19*a*, and 19*b* of the multilayer capacitor 10, respectively. Here, power lines and the outer electrodes are connected depending on the connection between the power lines and the mounting pads.

Accordingly, this ensures the multilayer capacitor is supported stably and allows only a desired one of the outer electrodes to be selectively connected to the power line.

In the present embodiment, the two mounting pads 22*a* and 23*b* are connected to power lines 24 and 25, and the other two mounting pads 22*b* and 23*a* are not connected to the power lines 24 and 25. Therefore, in the multilayer capacitor 10, only one pair of the first and second outer electrodes 18*a* and 19*b* can be directly connected to a power source through the power lines 24 and 25.

In a similar manner, referring to FIG. 4B, the outer electrodes 18*a*, 18*b*, 19*a*, and 19*b* of the multilayer capacitor 10 are soldered to be connected to four mounting pads 32*a*, 32*b*, 33*a*, and 33*b* provided on a printed circuit board 31. However, unlike the previous embodiment, the three mounting pads 32*a*, 33*b* and 33*a* are connected to power lines 34 and 35 and the other mounting pads 32*ba* are not connected to the power lines.

In this mounting position, in addition to one pair of the first and second outer electrodes 18*a* and 19*b* of the multilayer capacitor 10, the second outer electrode 19*a* of the other pair may be directly supplied with a power source through the power line 35.

As shown in FIG. 4A, in a case where the second outer electrode 19*b* is connected to the second power line 25 but the other second outer electrode 19*a* is not connected thereto, the second inner electrode 15*a* of group B2 receives a power source through the second inner connecting conductor 13 and the second outer electrode 19*a*. Therefore, the second inner electrode 15*a* of the group B2 is connected in series with the second inner connecting conductor 13 through the second outer electrode 19*a*. This series resistance leads to a relatively high ESR value (ESR1).

Meanwhile, as shown in FIG. 4B, in a case where the predetermined one 19*a* of the second outer electrodes is additionally connected to the second power line 35, the second outer electrode 19*a* serves as an outer terminal to allow the second inner electrode 15*a* of group B2 to be directly supplied with a power source. Therefore, the series-connected second inner electrode 15*a* of group B2 in FIG. 4A is connected in parallel with the other inner electrode 15*b* and the second inner connecting conductor 13, respectively. Accordingly, the multilayer capacitor connected as shown in FIG. 4B may have an ESR value (ESR2) lower than the ESR value obtained from the mounting configuration of FIG. 4A.

In addition, even though not illustrated, the other first outer electrode 18*b* may serve as an outer electrode for adjusting ESR. In a case where the first power line 31 is additionally connected to the other first outer electrode 18*b*, similarly to what has been described above, equivalent series resistance component generated by the series connection between the first inner connecting conductor 12 and the first inner electrode 14*a* of group A1 through the ESR-adjusting first outer electrode 18*b* is eliminated. Accordingly, this ensures lower an ESR value (ESR3) than the ESR value obtained from the mounting configuration of FIG. 4B.

As described above, the embodiment shown in FIG. 1 selectively employs another pair of the outer electrodes as an outer terminal, in addition to one pair of the outer electrodes. This allows the ESR value to be adjusted stepwise, as exemplified by ESR3<ESR2<ESR1.

Particularly, adjustment of ESR in this fashion can be made by a user in a process where the multilayer capacitor is mounted. A supplier may design a product to have various ESR values (three ESR values in the present embodiment) by selecting the number and location of inner connecting conductors appropriately. Then, a user may select a corresponding outer terminal to be connected to the power line in order to easily adjust ESR of the multilayer capacitor to a desired value.

Figure 5:
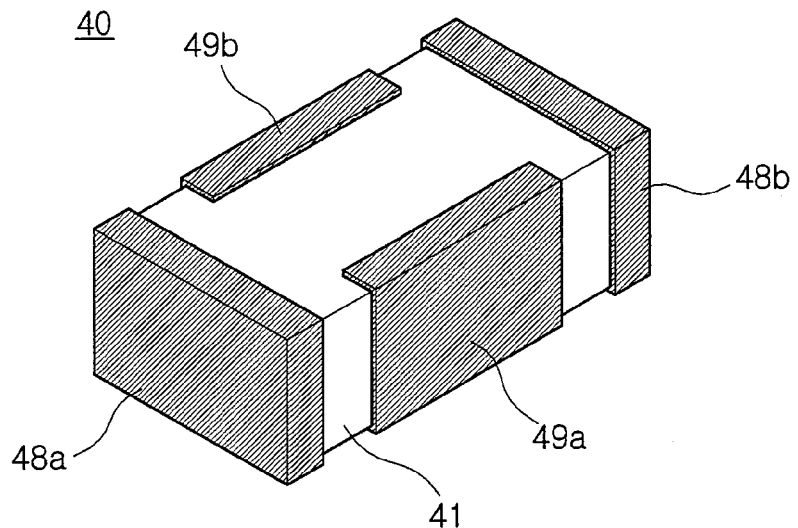
FIG. 5 is a perspective view illustrating a multilayer capacitor according to a second embodiment of the invention.

FIG. 5 illustrates a four-terminal multilayer capacitor according to a second embodiment of the invention. Unlike the first embodiment, the present embodiment employs a four terminal multilayer capacitor having outer electrodes located differently from the first embodiment.

Referring to FIG. 5, the multilayer capacitor 40 of the present embodiment includes a capacitor body 41 having a plurality of dielectric layers 41' laminated therein.

The capacitor body 41 of the present embodiment is of a rectangular parallelepiped structure having opposing first and second major surfaces and four side surfaces disposed therebetween. The first outer electrodes 48*a* and 48*b* and the second outer electrodes 49*a* and 49*b* are formed on the four side surfaces, respectively.

That is, as shown in FIG. 5, the first outer electrodes 48*a* and 48*b* are formed on opposing ones of the side surfaces of the body 41, respectively. Also, the second outer electrodes 49*a* and 49*b* are formed on the other opposing side surfaces of the body 41, respectively. As a result, the first and second outer electrodes 48*a* and 48*b*; 49*a* and 49*b* are arranged alternately to have opposite polarities along the four side surfaces.

Figure 6:
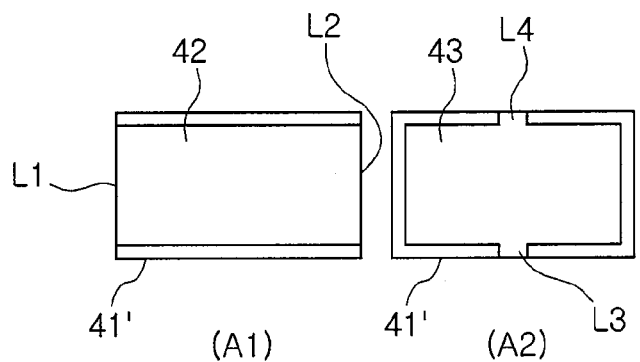
FIG. 6 is a plan view illustrating first and second inner connecting conductors applicable to the multilayer capacitor shown in FIG. 5.
Figure 7:
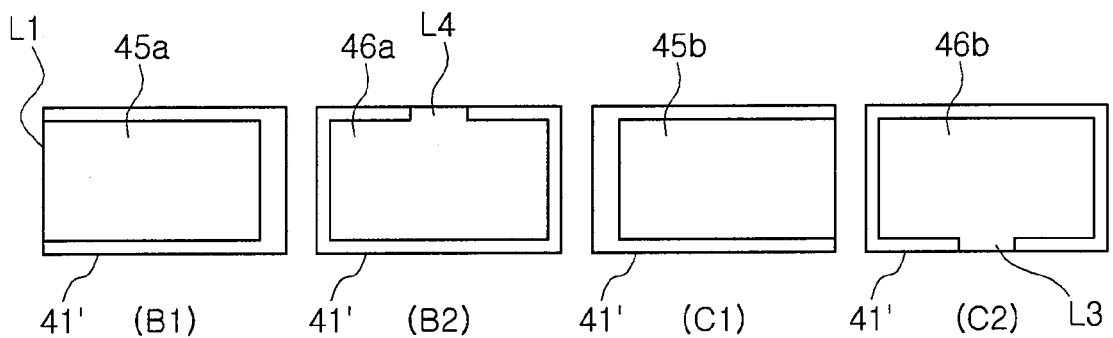
FIG. 7 is a plan view illustrating first and second inner electrodes applicable along with the first and second inner connecting conductors shown in FIG. 6.

In view of this arrangement of the outer electrodes, the multilayer capacitor 40 may include first and second inner connecting conductors 42 and 43 and first and second inner electrodes 45a, 46a, 45b, and 46b shown in FIGS. 6 and 7.

The plurality of first and second inner electrodes 45a, 46a, 45b, and 46b and the first and second inner connecting conductors 42 and 43 are arranged such that corresponding ones of the inner electrodes 45a, 46a, 45b, and 46b and the inner connecting conductors 42 and 43 having different polarities alternate with each other. The inner electrodes and inner connecting conductors can be laminated in various orders and numbers in the same manner as the first embodiment.

The first inner connecting conductor 42 is connected to the first outer electrodes 48a and 48b through two leads L1 and L2 extended to both side surfaces. Similarly, the second inner connecting conductor 43 is connected to the second outer electrodes 49a and 49b through two leads L3 and L4 extended to the other side surfaces.

Each of the first and second inner electrodes 45a, 46a, 45b, and 46b is selectively connected to a corresponding one of the outer electrodes 48a, 48b and 49a, 49b having identical polarity but different from each other.

For example, the first outer electrode 48a is connected to only the first inner electrode 44a of group B1 which is different from the first inner electrode 45b of group C1 having the other one 48b of the first outer electrodes connected thereto. In a similar manner, the second outer electrode 49a is connected to only the second inner electrode 46b of group C2 which is different from the second inner electrode 46a of group B2 having the other one 49b of the second outer electrodes connected thereto.

With this connection, the first and second inner electrodes 45a, 46a, 45b, and 46b can be electrically connected to corresponding ones of the inner connecting conductors 42 and 43 having identical polarity through the connected outer electrodes.

Also in the present embodiment, similarly to FIG. 1, in a case where a pair of outer electrodes 48a and 49b are directly connected to power lines, the other first and second outer electrodes 48b and 49b serve as outer connecting conductors which are not directly connected to the power lines but connected to the first inner electrode 45b of group C1, the second inner electrode 46a of group B2 and the first and second inner connecting conductors 42 and 43, respectively.

Therefore, the first inner electrode 45b of group C1 is connected in series to the first inner connecting conductor 42 through the first outer electrode 48bb as the outer connecting conductor. In a similar manner, the second inner electrode 46a of group B2 is connected in series to the second inner connecting conductor 43 through the outer electrodes 48b and 49b as the outer connecting conductor. This series connection brings in higher ESR.

Additionally, when at least one of the first and second outer electrodes 48b and 49b for adjusting ESR is connected to the power line, the series resistance does not occur and thus relatively low ESR is achieved.

As described above, the user the user's selection of the outer terminal enables desired different ESR values to be selected.

The present invention may be easily applicable to a six or more terminal structure other than a four terminal structure.

In a similar manner to the previous embodiment, in this six or more terminal structure, ESR can be adjusted by virtue of the inner connecting conductors. In addition, this embodiment does not require additional inner connecting conductors to be connected to all of the outer electrodes of identical polarity but allows ESR to be adjusted only by the inner electrodes according to selection of the outer electrode (see FIGS. 11, 12, 16, 17, and 21 to 24).

Figure 8:
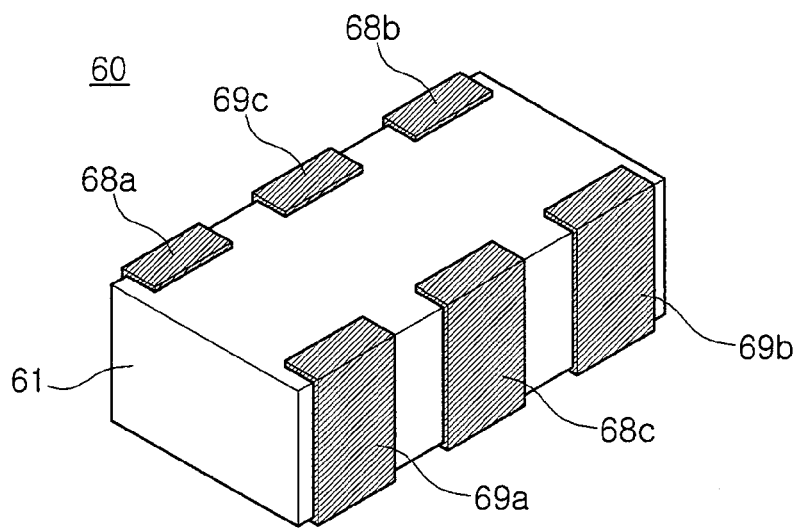
FIG. 8 is a perspective view illustrating a multilayer capacitor according to a third embodiment of the invention.

FIG. 8 is a perspective illustrating a six terminal multilayer capacitor according to a third embodiment of the invention.

Referring to FIG. 8, the multilayer capacitor 60 includes a capacitor body 61 having a plurality of dielectric layers 61' laminated therein.

The multilayer capacitor 60 includes three first electrodes 68a, 68b and 68c and three second outer electrodes 69a, 69b, and 69c formed on both opposing side surfaces to be electrically insulated from each other. As in the present embodiment, the first and second outer electrodes may be arranged such that adjacent ones of the outer electrodes have different polarities.

According to a first aspect of the invention, the multilayer capacitor 60 is structured to adjust ESR using an inner connecting conductor.

Figure 9:
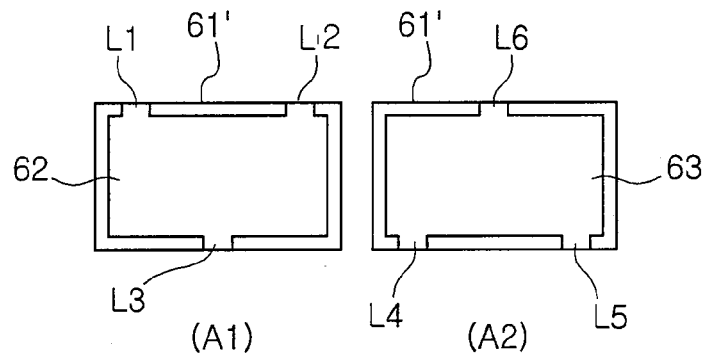
FIG. 9 is a plan view illustrating first and second inner connecting conductors applicable to the multilayer capacitor shown in FIG. 8.

In the present embodiment, as shown in FIG. 9, the multilayer capacitor 60 includes first and second inner connecting conductors 62 and 63 formed on the plurality of dielectric layers 61', respectively. The first inner connecting conductor 62 is connected to the three first outer electrodes 68a, 68b, and 68c through three leads L1, L2, and L3, respectively. Similarly, the second inner connecting conductor 63 is connected to the three second outer electrodes 69a, 69b, and 69c through three leads L4, L5, and L6.

The first and second inner electrodes applicable along with the first and second inner connecting conductors 62 and 63 may be formed in various patterns and combinations. Various examples of the first and second inner electrodes applicable to the present invention are shown in FIGS. 10A and 10B.

Figure 10A:
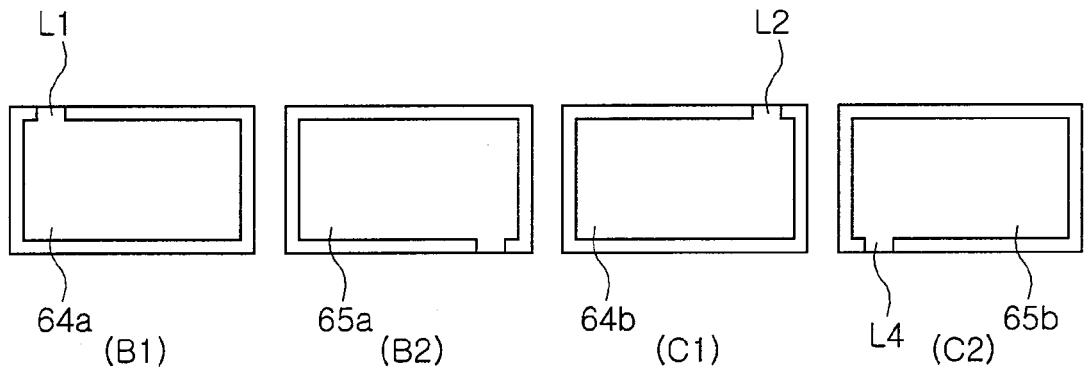
FIGS. 10A and 10B are plan views illustrating first and second inner electrodes applicable along with the inner connecting conductors of FIG. 9 in the multilayer capacitor shown in FIG. 8.
Figure 10B:
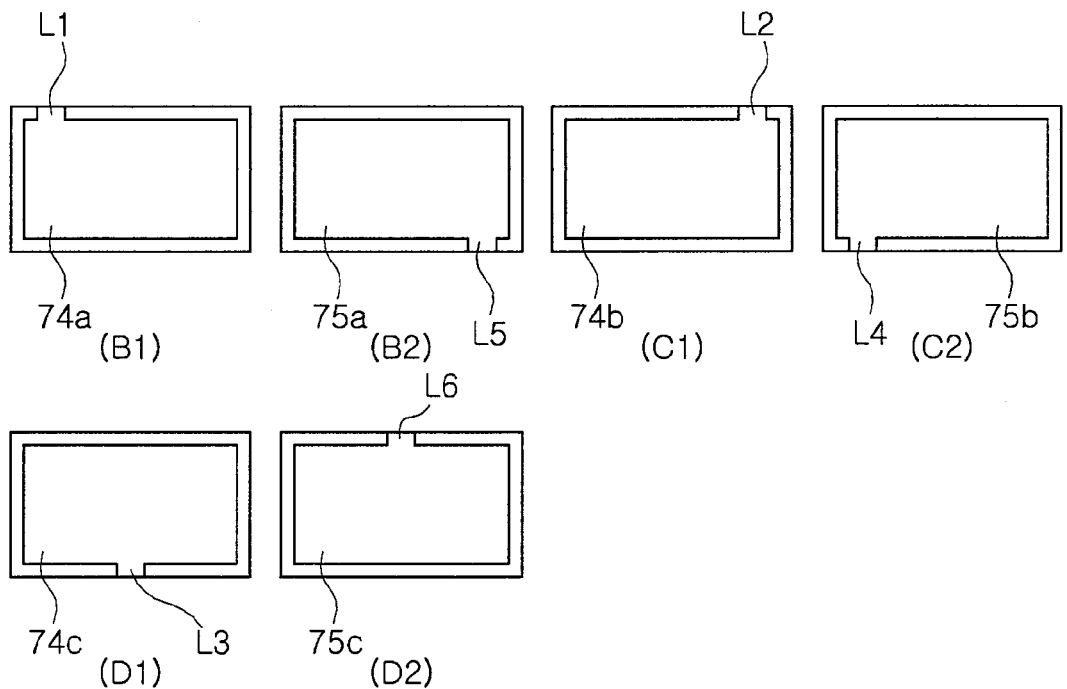

As shown in FIG. 10A, first and second inner electrodes 64a, 64b; 65a, 65b are divided into two groups B1, C1, B2, C2, respectively according to the structure of outer electrodes connected thereto (structure of leads). The first inner electrodes 64a and 64b of the respective groups are connected to the first outer electrodes 68a and 68b through one lead L1 or L2, respectively. Similarly, the second inner electrodes 65a and 65b of the respective groups are connected to the second outer electrodes 69a and 69b by one lead L3 or L4, respectively.

In a similar manner to the previous embodiment, the first and second inner electrodes 64a and 64b; 65a and 65b of the respective groups are connected to the outer electrodes that are different from one another for each of the groups.

As in the present embodiment, predetermined ones 68c and 69c of the first and second outer electrodes may not be connected to any of the inner electrodes but only the first and second inner connecting conductors 62 and 63. Therefore, in a case where only the first and second outer electrodes 68c and 69c are connected to power lines, the other four outer electrodes 68a, 68b, 69a, and 69b are not connected to the power lines but act as outer connecting conductors for connecting the inner electrodes 64a, 64b, 65a, and 65b in series with the inner connecting conductors 68a, 69b, 68b, and 69a to have identical polarity to each other. This ensures relatively high ESR.

Also, in a case where one of the outer electrodes 68a, 68b, 69a, and 69b not connected to the power lines is connected to the power line, the inner electrode connected to the outer electrode is again connected in parallel with the inner connecting conductor 62 or 63 of identical polarity. This leads to lower ESR. As described above, the four outer electrodes 68a, 68b, 69a, and 69b may serve as a means for adjusting ESR. In the present embodiment, at least five ESR values may be selectively attained according to the number of the outer electrodes connected to the power lines.

First and second inner electrodes 74*a*, 74*b*, and 74*c*; 75*a*, 75*b*, and 75*c* shown in FIG. 10B are divided into three groups, respectively according to outer electrodes connected thereto. Similarly to FIG. 10A, the first inner electrodes 74*a*, 74*b*, and 74*c* of the respective groups are connected to first outer electrodes 68*a*, 68*b*, and 68*c* by one lead L1, L2, or L3. The second inner electrodes 75*a*, 75*b*, and 75*c* of the respective groups are connected to second outer electrodes 69*c*, 69*a*, and 69*b* by one lead L6, L4, or L5.

However, unlike the inner electrode shown in FIG. 10A, the first and second inner electrodes 74*c* and 75*c* of additional groups D1 and D2, respectively are connected to the first and second outer electrodes 68*c* and 69*c* not connected to the inner electrodes in FIG. 10A. Accordingly, the inner electrodes of the different groups are connected to all of the outer electrodes.

In a case where an arbitrary pair of first and second outer electrodes 68*a* and 69*a* are selected as an outer terminal connected to the power line, the other four outer electrodes 68*b*, 68*c*, 69*b*, and 69*c* and act as outer connecting conductors for connecting the inner electrodes 74*b*, 74*c*, 75*c*, and 75*a* with the inner connecting conductors 62 and 63, respectively to have identical polarity to each other. Also, the inner electrodes 74*b*, 74*c*, 75*c*, and 75*a* are connected in series with the inner connecting conductors 62 and 63 by each of the outer connecting conductors. Accordingly, this ensures high ESR.

Also in this case, the four outer electrodes may serve to adjust ESR, respectively. For example, five ESR values may be selected according to the number of the outer electrodes connected to the power lines.

The inner electrodes shown in FIGS. 10A and 10B are illustrated to be employed along with the inner connecting conductors shown in FIG. 9. However, as in the present embodiment, a multi-terminal multilayer capacitor such as a six or more terminal may not employ the inner connecting conductors connected to all of the outer electrodes of identical polarity to achieve ESR adjustment In a configuration where the inner connecting conductors are not employed, the inner electrodes of the each group are not connected to all of the outer electrodes but at least two of the outer electrodes. At least one of the outer electrodes connected to the inner electrodes belonging to a respective one of the groups is different from the outer electrodes connected to the inner electrodes belonging to another one of the groups. However, at least one of the outer electrodes connected to the inner electrodes of one of the groups is connected to the inner electrodes of another one of the groups such that the inner electrodes of all of the groups are connected together.

Figure 11:
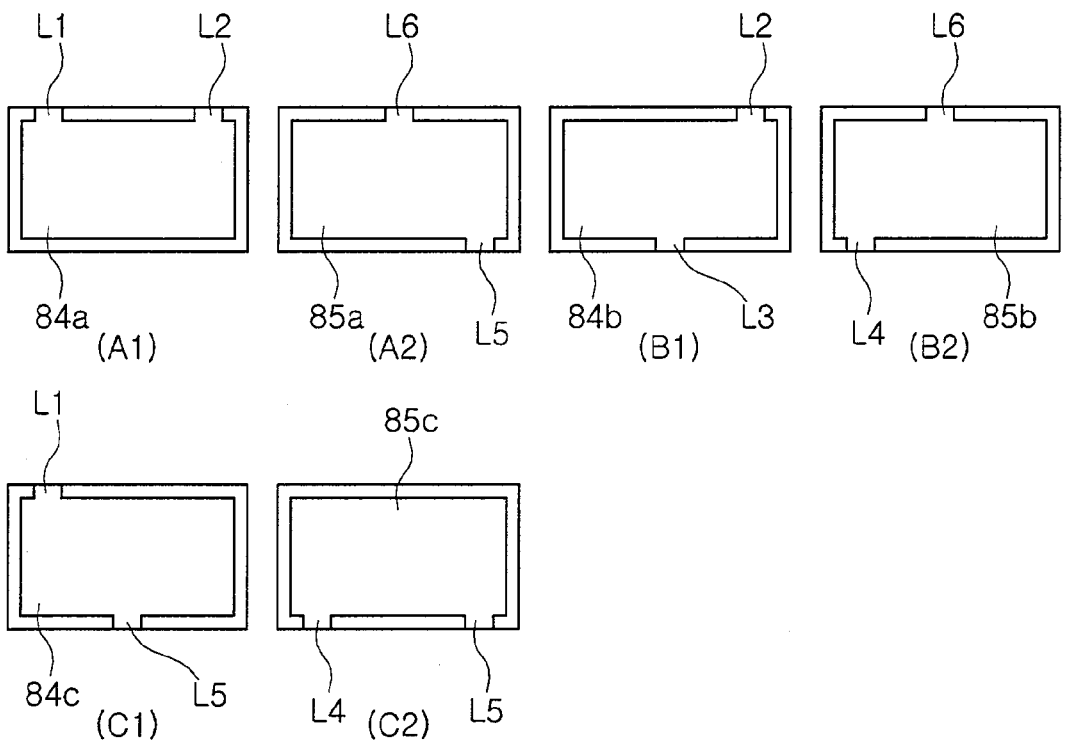
FIG. 11 illustrates first and second inner electrodes (without inner connecting conductor) applicable to the multilayer capacitor shown in FIG. 8.
Figure 12:
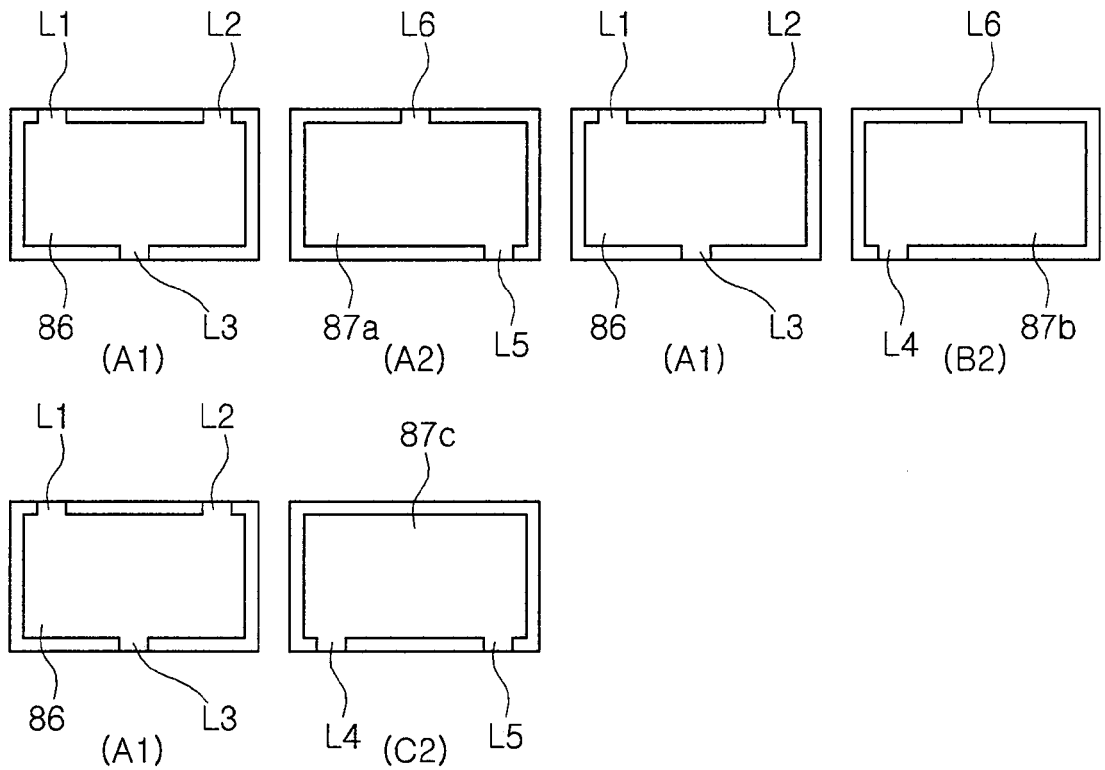
FIG. 12 illustrates first and second inner electrodes (without inner connecting conductor) applicable to the multilayer capacitor shown in FIG. 8.

FIGS. 11 and 12 illustrate various examples of first and second inner electrodes applicable to the multilayer capacitor shown in FIG. 8.

As shown in FIG. 11, first and second inner electrodes 84*a*, 84*b*, and 84*c*; 85*a*, 85*b*, and 85*c* are divided into three groups A1-B1-C1, A2-B2-C2, respectively according to outer electrodes connected thereto.

The first inner electrodes 84*a*, 84*b*, and 84*c* for the respective groups are connected to two of the first outer electrodes 68*a*, 68*b*, and 68*c* by two of leads L1, L2, and L3.

One of the two first outer electrodes connected to the first inner electrodes belonging to a respective one of the groups is different from outer electrodes connected to the first inner electrodes belonging to another one of the groups. Moreover, one of the outer electrodes connected to the inner electrodes of one of the groups is also connected to the inner electrodes of another one of the groups. This allows the first inner electrodes of the three groups to be electrically connected to one another.

For example, the first inner electrodes are electrically connected to one another in the order of group A1—the first outer electrode 68*b*—group B1—the first outer electrode 68*c*—group C1—the first outer electrode 68*a*—group A1.

In a similar manner, the second inner electrodes 85*a*, 85*b*, and 85*c* of a respective one of the groups are not connected to all of the second outer electrodes but only two of the second outer electrodes. Also, one of the second outer electrodes connected to the second inner electrodes 85*a*, 85*b*, and 85*c* belonging to a respective one of the groups is different from the second outer electrode connected to the second inner electrode connected to the second inner electrode belonging to another one of the groups. However, at least one of the second outer electrodes connected to the second inner electrode of one of the groups is connected to the second inner electrode of another one of the groups such that the second inner electrodes 85*a*, 85*b*, and 85*c* of all of the groups are electrically connected to one another.

In this connection configuration between the outer electrodes and the inner electrodes, the inner electrodes of a predetermined one of the groups may act as an inner connecting conductor depending on the connection between the outer electrodes and the power lines.

For example, when the power lines are connected to predetermined ones of the first and second outer electrodes 68*a* and 69*a*, the first inner electrodes of group A1 and group C1 are connected in series with the first inner electrodes of group B1 through the other first outer electrodes 68*b* and 68*a*, respectively. Also, the second inner electrodes of group B2 and group C2 are connected in series with the second inner electrodes of group A2 through the other second outer electrodes 69*c* and 69*c*, respectively.

Therefore, this series connection increases resistance and thus ensures high ESR.

Optionally, to attain lower ESR characteristics, a user may additionally connect the first and second outer electrodes 68*b* and 68*c*; 69*b* and 69*c* not connected to the power lines in the previous embodiment to the power lines. As described above, additional connection between the power lines and the outer electrodes prevents series resistance from occurring.

That is, in a case where the power line is additionally connected to at least one of the first outer electrodes 68*b* and 68*a*, the first inner electrode of group B1 is directly connected to the power line and thus connected in parallel with the inner electrode of another group, thereby eliminating resistance component induced by series connection. Accordingly, this may lead to relatively lower ESR.

Referring to FIG. 12, only second inner electrodes 87*a*, 87*b*, and 87*c* are divided into three groups A2, B2, and C2, and first inner electrodes 86 are arranged with a general configuration, for example, connected to all of outer electrodes. The first inner electrodes 86 pair with the second inner electrodes 87*a*, 87*b*, and 87*c* of the respective groups.

The first inner electrodes 86 are connected to the first outer electrodes 68*a*, 68*b*, and 68*c* by three leads L1, L2, and L3, respectively. In a similar manner to FIG. 10C, the second inner electrodes 87*a*, 87*b*, and 87*c* are connected to two of the second outer electrodes 69*a*, 69*b*, and 69*c* that are different from one another for each of the groups, by two of the leads L4, L5, and L6, respectively.

In the present embodiment, selective connection of the second outer electrodes allows ESR characteristics to be adjusted, in a similar manner to FIG. 11.

Figure 13:
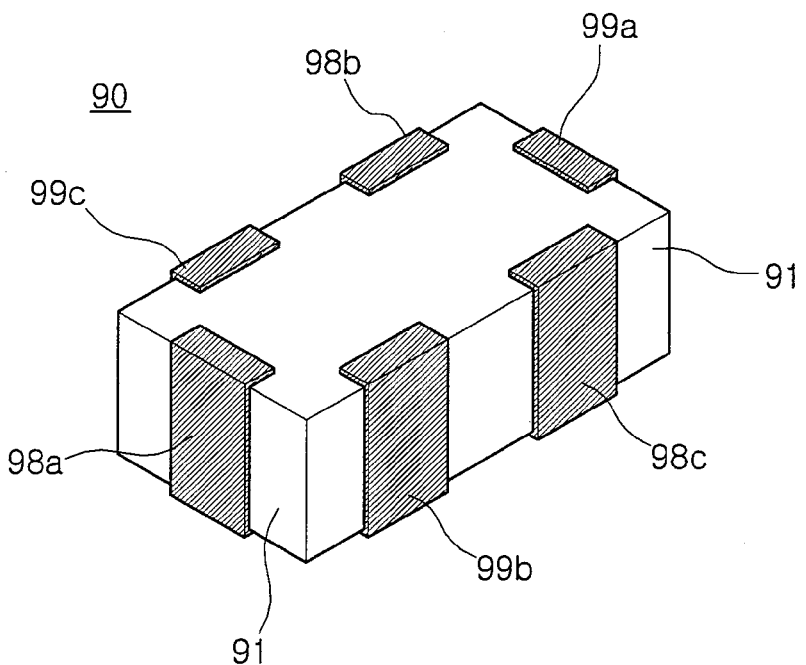
FIG. 13 is a perspective view illustrating a multilayer capacitor according to a fourth embodiment of the invention.

FIG. 13 is a perspective view illustrating a six terminal multilayer capacitor according to a fourth embodiment of the invention.

Referring to FIG. 13, the multilayer capacitor 90 of the present embodiment includes a capacitor body 91 where a plurality of dielectric layers 91 are laminated.

The capacitor body 91 is formed of a rectangular parallelepiped structure having opposing first and second main surfaces and four side surfaces interposed therebetween. The multilayer capacitor 90 includes respective three first and second outer electrodes 98a, 98b, and 98c; 99a, 99b, and 99c arranged to have different polarities alternating along the four side surfaces.

Moreover, as shown in FIG. 13, two first and second outer electrodes are formed on both opposing side surfaces (length direction) of the body 91, respectively, and first and second outer electrodes are formed on the other opposing side surfaces (width direction), respectively.

Figure 14:
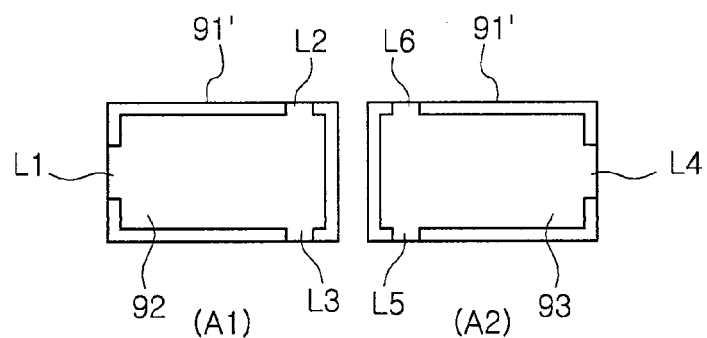
FIG. 14 is a plan view illustrating first and second inner connecting conductors applicable to the multilayer capacitor shown in FIG. 13.

As shown in FIG. 14, the multilayer capacitor 90 may include first and second inner connecting conductors 92 and 93 formed on each of the plurality of dielectric layers 91'.

The first inner connecting conductor 92 is connected to the first outer electrodes 98a, 98b, and 98c through three leads L1, L2, and L3, respectively. Similarly, the second inner connecting conductor 93 is connected to the second outer electrodes 99a, 99b, and 99c through thee leads L4, L5, and L6, respectively.

Figure 15:
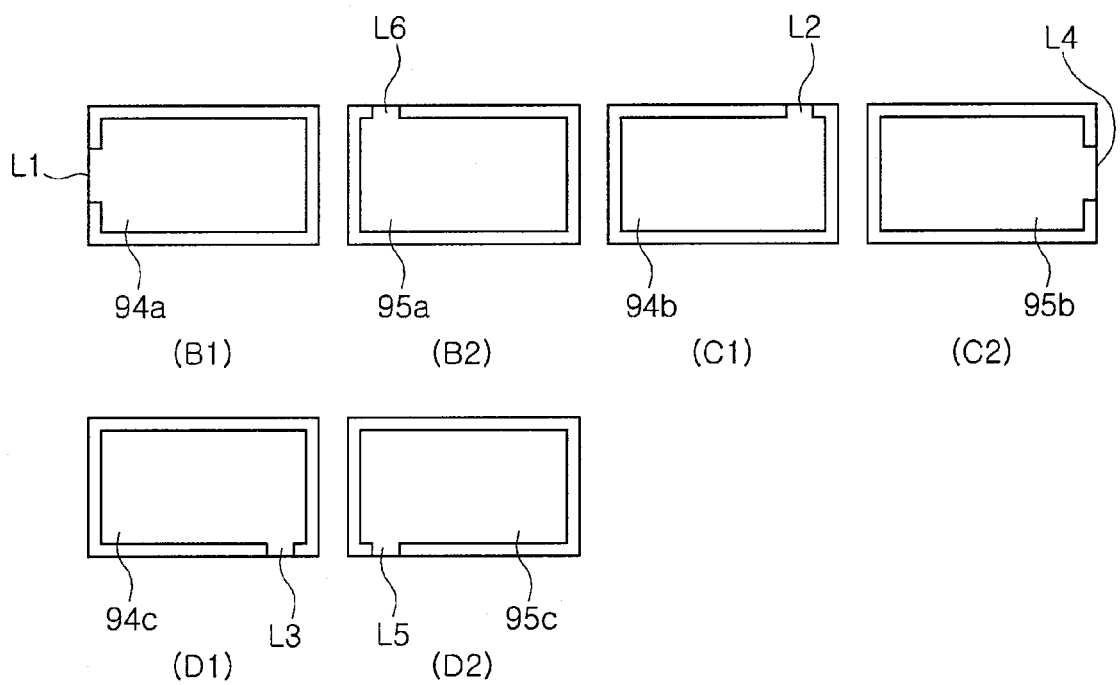
FIG. 15 is a plan view illustrating various examples of first and second inner electrodes applicable to the first and second inner connecting conductors shown in FIG. 13.

The first and second inner electrodes applicable along with the first and second inner connecting conductors 92 and 93 shown in FIG. 14 may be configured in various patterns and combinations. FIG. 15 illustrates first and second inner electrodes applicable to the present embodiment.

First and second inner electrodes 94a, 94b, and 94c; 95a, 95b, and 95c shown in FIG. 15 are divided into three groups, respectively according to outer electrodes connected thereto. The first inner electrodes 94a, 94b, and 94c of the respective groups are connected to the first outer electrodes 98a, 98b, and 98c by leads L1, L2, and L3, respectively. The second inner electrodes 95a, 95b, and 95c of the respective groups are connected to the second outer electrodes 99c, 99a, and 99b by leads L6, L4, and L5, respectively.

The first and second inner electrodes 94a, 94b, and 94c; 95a, 95b, and 95c are connected to the first and second outer electrodes 98a, 98b, and 98c; 99c, 99a, and 99b that are different from one another for each of the groups.

In the present embodiment, the first and second outer electrodes 98a, 98b, and 98c; 99a, 99b, and 99c are connected to the first and second inner connecting conductors 92 and 93 and the first and second inner electrodes of only the predetermined group, respectively but not connected to the first and second inner electrodes of the other groups.

In a case where a pair of first and second outer electrodes 98a and 99a are outer terminals connected to power lines, the other four outer electrodes 98b, 98c, 99b, and 99c act as an outer connecting conductor to add to series resistance, thereby achieving relatively high ESR. Here, the four outer electrodes 98b, 98c, 99b, and 99c may serve as ESR-adjusting outer terminals capable of changing ESR independently. Therefore, five ESRs can be attained selectively according to the connection between the four outer electrodes 98b, 98c, 99b, and 99c to the power lines.

Figure 16:
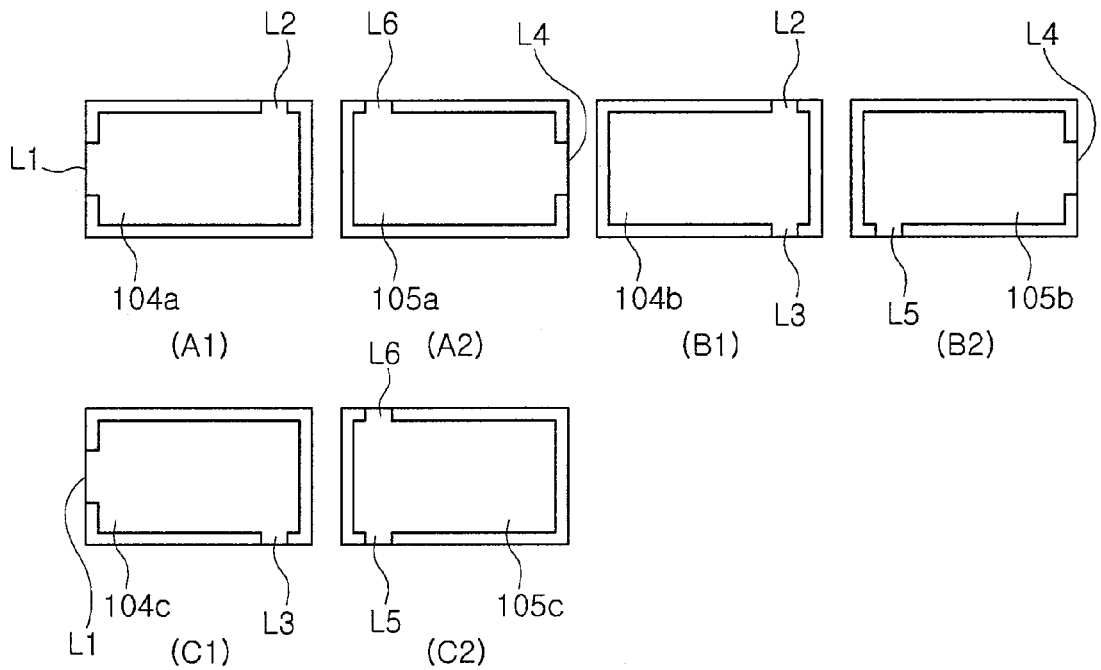
FIG. 16 is a plan view illustrating first and second inner electrodes applicable to the multilayer capacitor shown in FIG. 11 according to an exemplary embodiment of the invention.

First and second inner electrodes 104a, 104b, and 104c; 105a, 105b, and 105c shown in FIG. 16 are divided into three groups, respectively according to outer electrodes connected thereto. The inner electrodes configured as shown in FIG. 16 enable a multilayer capacitor for adjusting ESR without the inner connecting conductor shown in FIG. 14.

The first inner electrodes 104a, 104b, and 104c of the respective groups are connected to two of the first outer electrodes 98a, 98b, and 98c that are different from one another for each of the groups, by two of leads L1, L2, and L3. The second inner electrodes 105a, 105b, and 105c are connected to two of the second outer electrodes 99a, 99b, and 99c that are different from one another for each of the groups, by two of leads L4, L5, and L6.

The first inner electrodes 104a, 104b, and 104c are connected to two of the first outer electrodes 98a, 98b, and 98c that are different from one another for the each group, by two of the leads L1, L2, and L3. One of the two first outer electrodes connected to the first inner electrodes belonging to a respective one of the groups is different from the outer electrodes connected to the first inner electrodes belonging to another one of the groups. Also, one of the outer electrodes connected to the inner electrodes belonging to one of the groups is connected to the inner electrodes of another one of the groups. This allows the first inner electrodes of the three groups to be electrically connected to one another.

The adjustment of ESR in the present embodiment can be understood with reference to the related description in FIG. 11.

Figure 17:
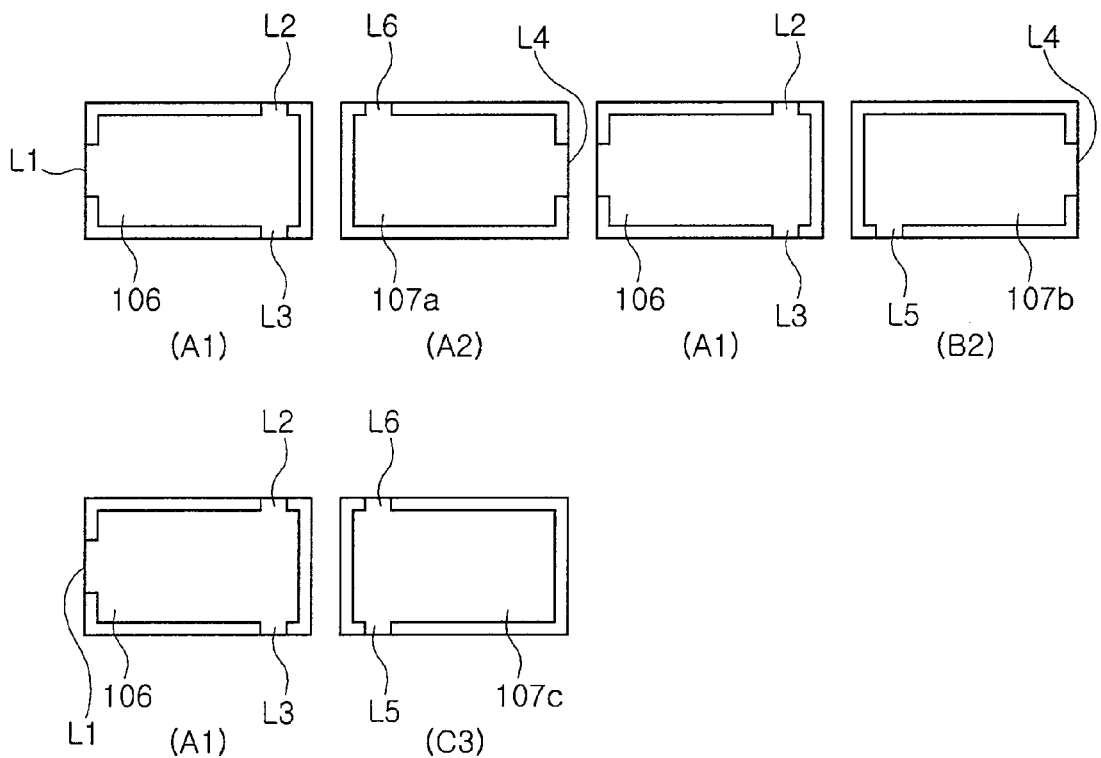
FIG. 17 is a plan view illustrating first and second inner electrodes applicable to the multilayer capacitor shown in FIG. 11 according to an exemplary embodiment of the invention.

In the embodiment shown in FIG. 17, only the second inner electrodes 107a, 107b, and 107c are divided into three groups according to outer electrodes connected thereto. Also, the first inner electrodes 106 are formed in a similar pattern to the first inner connecting conductor 92 and pair with the second inner electrodes 107a, 107b, and 107c of the respective groups.

In the present embodiment, in a similar manner to a combined configuration of the inner electrodes shown in FIG. 12, only the second outer electrodes connected to the second inner electrodes are utilized to adjust ESR characteristics. Of course, contrarily, the first inner electrodes may be formed of patterns for adjusting ESR and the second inner electrodes may be configured similarly to general inner electrodes, i.e., in a similar pattern to the inner connecting conductors 93.

The present invention is applicable to an eight terminal structure in a similar manner to the previous embodiment.

Figure 18:
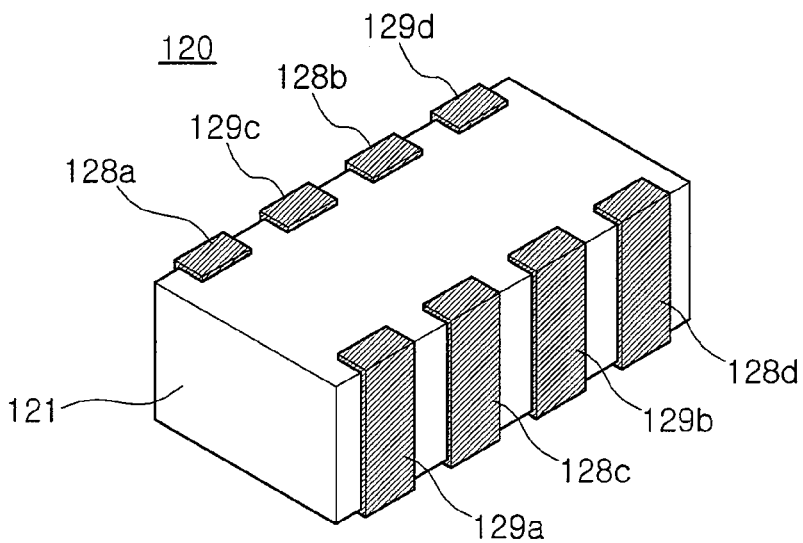
FIG. 18 is a perspective view illustrating a multilayer capacitor according to a fifth embodiment of the invention.

FIG. 18 is a perspective view illustrating an example of an eight terminal multilayer capacitor according to an eighth embodiment of the invention.

Referring to FIG. 18, the multilayer capacitor 120 of the present embodiment includes a capacitor body 121 where a plurality of dielectric layers 121' are laminated.

The multilayer capacitor 120 includes respective four first and second outer electrodes 128a, 128b, 128c, and 128d; 129a, 129b, 129c, and 129d formed on two opposing surfaces thereof to be electrically insulated from each other. The outer electrodes may be arranged such that adjacent ones of the outer electrodes on each of the side surfaces have opposite polarities in order to reduce ESL.

As in the present embodiment, the outer electrodes of opposite polarities are arranged at corresponding positions on the opposing side surfaces. This allows currents on both side surfaces to flow in opposite directions, thereby canceling out magnetic flux.

Figure 19:
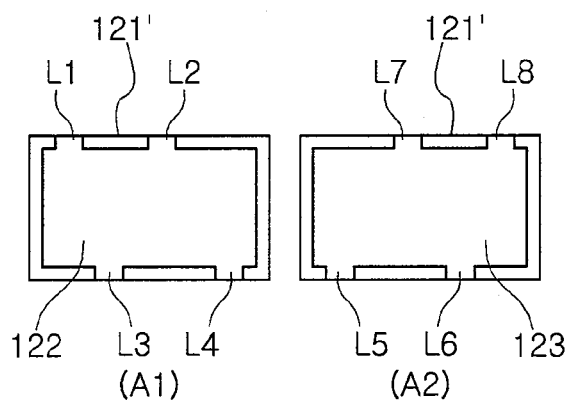
FIG. 19 is a plan view illustrating first and second inner connecting conductors applicable to the multilayer capacitor shown in FIG. 18.

As shown in FIG. 19, the multilayer capacitor 120 may include first and second inner connecting conductors 122 and 123 formed on each of the plurality of dielectric layers 121'. The first inner connecting conductors 122 are connected to the first outer electrodes 128a, 128b, and 128c, 128d through four leads L1, L2, L3, and L4, respectively. Similarly, the second inner connecting conductors 123 are connected to second outer electrodes 129a, 129b, 129c, and 129d through four leads L4, L5, L6, and L7, respectively.

Figure 20:
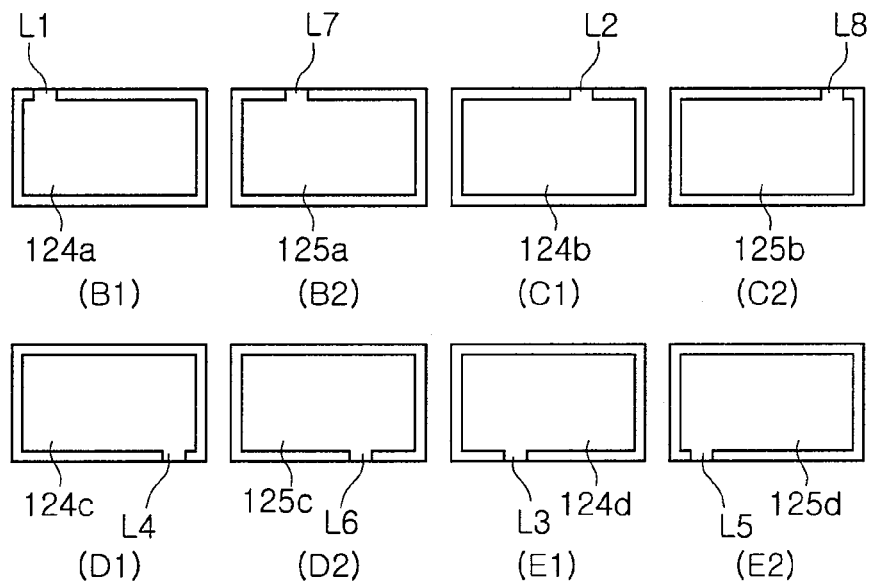
FIG. 20 is a plan view illustrating first and second inner electrodes applicable along with the first and second inner connecting conductors shown in FIG. 19.

The first and second inner electrodes applicable along with the first and second inner connecting conductors 122 and 123 shown in FIG. 19 may be configured in various patterns and combinations. FIG. 20 illustrates inner electrodes applicable along with the inner connecting conductors of FIG. 19.

First inner electrodes 124a, 124b, 124c, and 124d shown in FIG. 20 and the second inner electrodes 125a, 125b, 125c, and 125 are divided into four groups, respectively according to outer electrodes connected thereto.

The first inner electrodes 124a, 124b, 124c, and 124d of the respective groups are connected to first outer electrodes 128a, 128b, 128c, and 128d by leads L1, L2, L3, and L4, respectively. Second inner electrodes 125a, 125b, 125c, and 125d of the respective groups are connected to the second outer electrodes 129c, 129d, 129b, and 129a by leads L7, L8, L6, and L5, respectively.

The first and second inner electrodes 124a, 124b, 124c, and 124d; 125a, 125b, 125c, and 125 may be connected to the first and second outer electrodes that are different from one another for each of the groups.

In the present embodiment, the first and second outer electrodes 128a, 128b, 128c, and 128d; 129a, 129b, 129c, and 129d are connected to the first and second inner connecting conductors 122 and 123 and the first and second inner electrodes of only the specific group, but not connected to the inner electrodes of the other groups.

However, the present invention is not limited thereto. In a case where at least two outer electrodes are connected to the inner electrodes of one group, the outer electrodes may be commonly connected to the outer electrodes of the other groups.

In the ESR-adjusting multilayer capacitor employing the inner electrodes shown in FIG. 20 together with the inner connecting conductors shown in FIG. 19, when a pair of first and second outer electrodes 128a and 129a are connected to power lines, the other six outer electrodes 128b, 128c, 128d, 129b, 129c, and 129d may act as an outer connecting conductor to add to series resistance, thereby assuring relatively high ESR.

Particularly, the other six outer electrodes 128b, 128c, 128d, 129b, 129c, and 129d may be an ESR-adjusting outer terminal capable of adjusting ESR of the capacitor independently. Accordingly, seven ESR values may be selectively attained stepwise according to the number of the power lines connected thereto.

Figure 21:
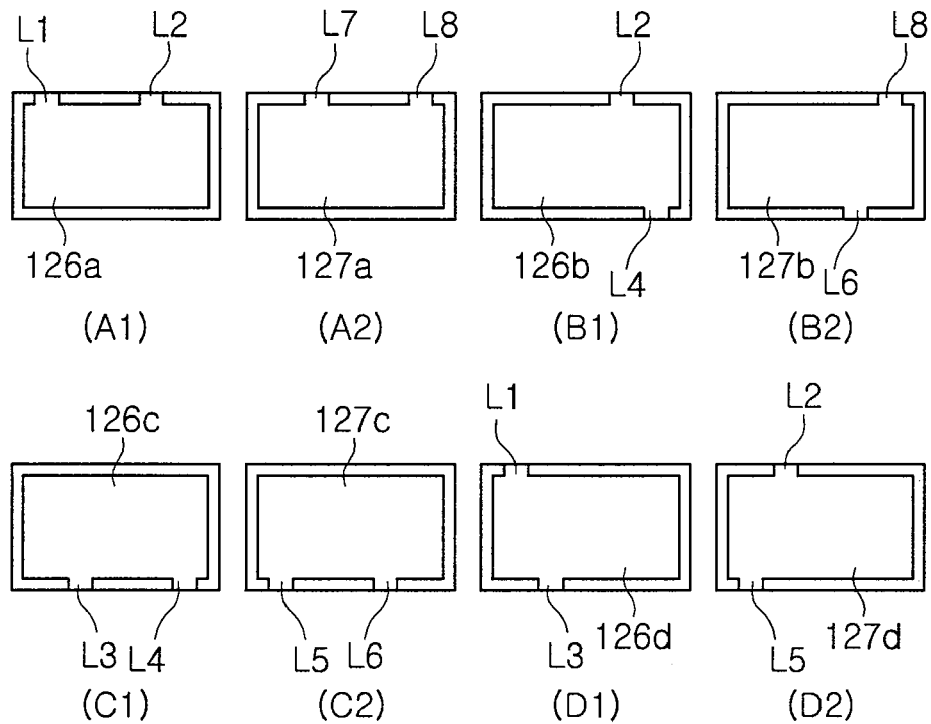
FIG. 21 is a plan view illustrating first and second inner electrodes applicable to the multilayer capacitor shown in FIG. 18 according to an exemplary embodiment of the invention.

The inner electrodes configured as shown in FIG. 21 enable realization of the multilayer capacitor for adjusting ESR without the inner connecting conductor shown in FIG. 19.

The first and second inner electrodes 126a, 126b, 126c, and 126d; 127a, 127b, 127c, and 127d shown in FIG. 21 are divided into four groups, respectively according to outer electrodes connected thereto.

The first inner electrodes 126a, 126b, 126c, and 126d are connected to two of the first outer electrodes 128a, 128b, 128c, and 128d that are different from one another for each of the groups, by two of leads L1, L2, L3, and L4. The second inner electrodes 127a, 127b, 127c, and 127d are connected to two of the second outer electrodes 129a, 129b, 129c, and 129d that are different from one another for the each group, by two of leads L5, L6, L7, and L8.

The first inner electrodes 126a, 126b, 126c, and 126d of the respective groups are connected to two of first outer electrodes 128a, 128b, 128c, and 128d by two of the leads L1, L2, L3, and L4, respectively. One of the two first outer electrodes connected to the first inner electrodes belonging to a respective one of the groups is different from the outer electrodes connected to the first inner electrodes belonging to another one of the groups. Also, one of the outer electrodes connected to the inner electrodes belonging to one of the groups is connected to the inner electrodes belonging to another one of the groups. This allows the first inner electrodes of the three groups to be electrically connected to one another.

For example, the first inner electrodes are electrically connected to one another in the order of group A1—the first outer electrode 128b—group B1—the first outer electrode 128d—group C1—the first outer electrode 128b—group D1—the first outer electrode 128c—group A1.

In a similar manner, the second inner electrodes of the respective groups are not connected to all of the second outer electrodes but two of the second outer electrodes. One of the second outer electrodes connected to the second inner electrodes belonging to a respective one of the groups is different from the second outer electrodes connected to the second inner electrodes belonging to another one of the groups. However, at least one of the second outer electrodes connected to the second inner electrodes belonging to one of the groups is connected to the second inner electrodes of another one of the groups such that the second inner electrodes of all the groups are electrically connected to one another.

In this connection between the outer electrodes and the inner electrodes, the inner electrodes of the specific group may serve as an inner connecting conductor according to the connection between the outer electrodes and power lines. This allows the inner electrodes of one of the groups to be connected in series with the inner electrodes of another group to increase resistance component, thereby assuring relatively high ESR characteristics.

Optionally, to adjust ESR characteristics, a user may additionally connect other first and second outer electrodes than a pair of first and second outer electrodes basically connected to the power lines. With this additional connection between the power lines and the outer electrodes, series-connected resistance components are connected in parallel to one another to thereby reduce ESR characteristics.

Figure 22:
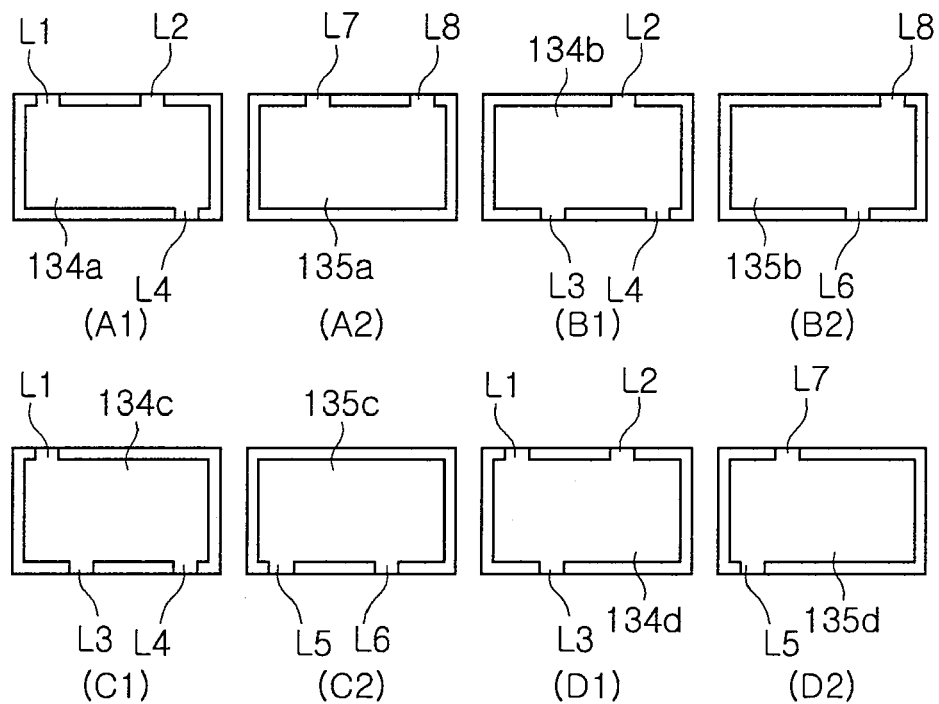
FIG. 22 is a plan view illustrating first and second inner electrodes applicable to the multilayer capacitor shown in FIG. 18 according to an exemplary embodiment of the invention.

First inner electrodes 134a, 134b, 134c, and 134d and the second inner electrodes 135a, 135b, 135c, and 135d shown in FIG. 22 are divided into four groups, respectively according to outer electrodes connected thereto.

In the present embodiment, the first and second inner electrodes are connected to outer electrodes of a different number, respectively. More specifically, the first inner electrodes 134a, 134b, 134c, and 134d of the respective groups are connected to three of the first outer electrodes 128a, 128b, 128c, and 128d by three of leads L1, L2, L3, and L4, respectively. However, in a similar manner to the previous embodiment, the second inner electrodes of the respective groups are connected to two of the second outer electrodes 129c, 129d, 129b, and 129a by two of leads L7, L8, L6, and L5, respectively.

Figure 23:
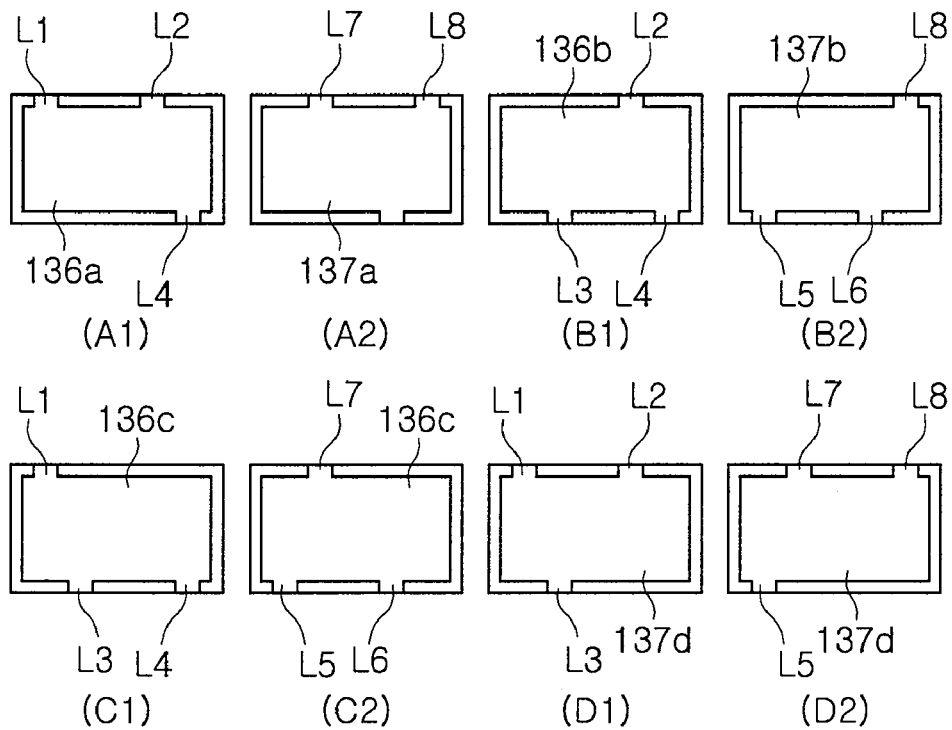
FIG. 23 is a plan view illustrating first and second inner electrodes applicable to the multilayer capacitor shown in FIG. 18 according to an exemplary embodiment of the invention.

In the embodiment shown in FIG. 23, first and second inner electrodes 136a, 136b, 136c, and 136d; 137a, 137b, 137c, and 137d are divided into four groups, respectively according to outer electrodes connected thereto.

The first inner electrodes 136a, 136b, 136c, and 136d are connected to three of the first outer electrodes 128a, 128b, 128c, and 128d that are different from one another for each of the groups, by three of leads L1, L2, L3, and L4. The second inner electrodes 127a, 127b, 127c, and 127d are connected to three of the second outer electrodes 129a, 129b, 129c, and 129d that are different from one another for the each group, by three of leads L5, L6, L7, and L8.

Figure 24:
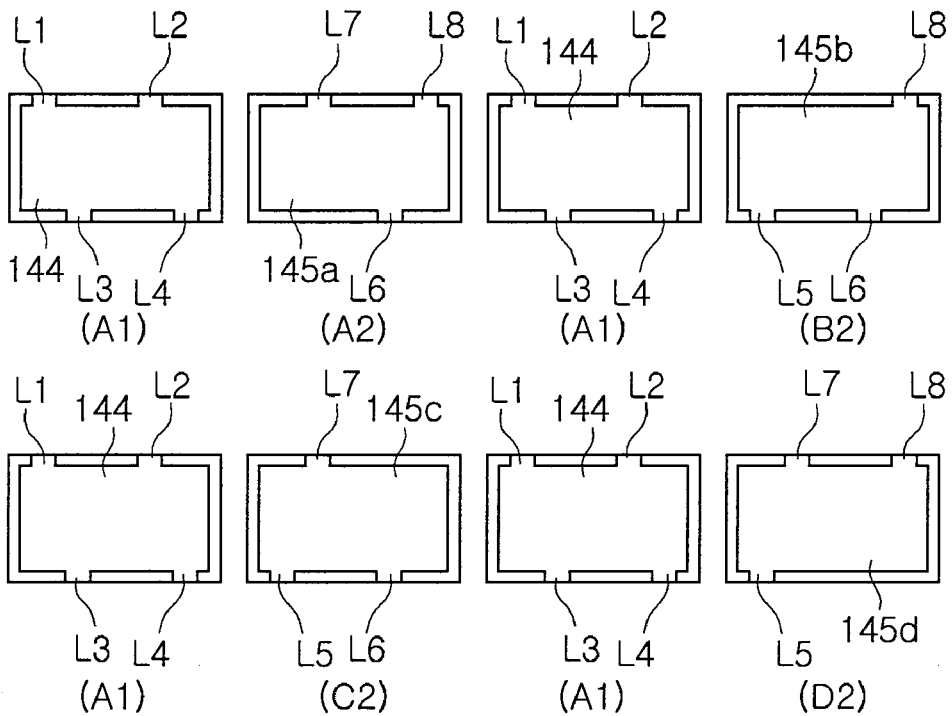
FIG. 24 s a plan view illustrating first and second inner electrodes applicable to the multilayer capacitor shown in FIG. 18 according to an exemplary embodiment of the invention.

In the embodiment shown in FIG. 24, only second inner electrodes 145a, 145b, 145c, and 145d are divided into four groups according to the outer electrode connected thereto.

First inner electrodes 144 are formed of a similar pattern to the first inner connecting conductors 122, and pair with the second inner electrodes 145a, 145b, 145c, and 145d of the respective groups.

That is, the first inner electrodes 144 are all connected to the first outer electrodes 128a, 128b, 128c, and 128d by four leads L1, L2, L3, and L4, respectively. Also, in a similar manner to FIG. 16D, the second inner electrodes 145a, 145b, 145c. and 145d are connected to two of the second outer electrodes 129a, 129b, 129c that are different from one another for the each group, by three of leads L5, L6, L7, and L8.

Similarly to FIG. 12, in this structure, only selective connection between the second outer electrodes connected to the second inner electrodes and power lines allows ESR characteristics of the multilayer capacitor to be adjusted.

The present invention is beneficially applicable to a multilayer capacitor structure in which a laminated direction is perpendicular to a mounting surface.

Figure 25:
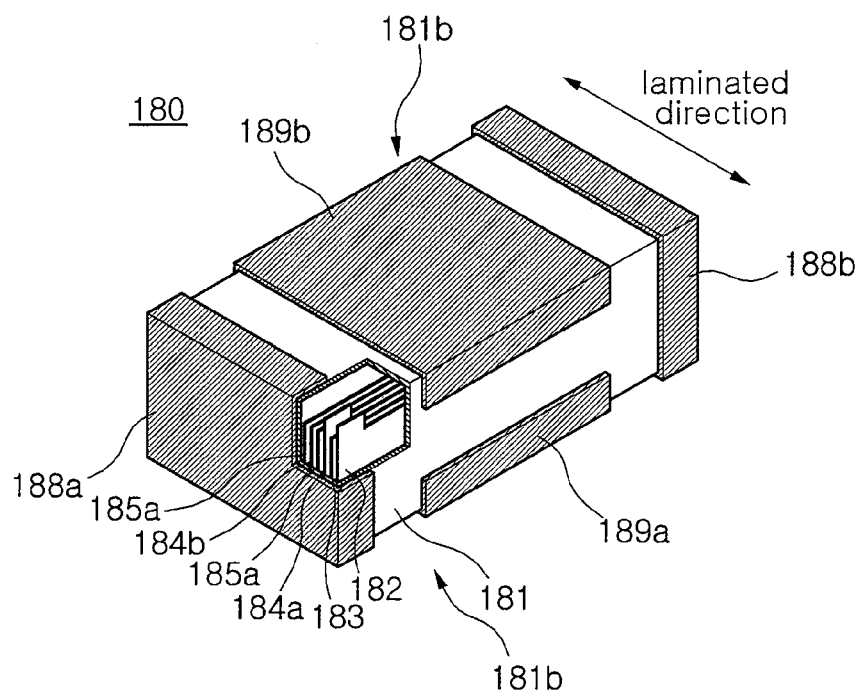
FIG. 25 is a perspective view illustrating a multilayer capacitor according to a sixth embodiment of the invention, which is formed of a four terminal structure having a laminated direction varied.

FIG. 25 is a perspective view illustrating a multilayer capacitor according to a sixth embodiment of the invention, which is formed of a four terminal structure having a laminated direction varied.

As shown in FIG. 25, the multilayer capacitor 180 of the present embodiment includes a capacitor body 181 where a plurality of dielectric layers 181' are laminated. The body 181 is formed along a laminated direction and configured as a rectangular parallelepiped structure having opposing first and second surfaces 181a and 181b and four side surfaces interposed therebetween. In the multilayer capacitor 180, one of the first and second surfaces 181a and 181b provides a mounting surface.

The first and second outer electrodes 188a, 188b; 189a, 189b are formed along the four side surfaces. That is, as shown, the first outer electrodes 188a and 188b are formed on two opposing ones of the side surfaces of the body 181, respectively. Also, the second outer electrodes 189a and 189b are formed on the first and second surfaces 181a and 181b of the body 181. Accordingly, the first and second outer electrodes 188a, 188b; 189a, 189b are arranged to have opposite polarities alternating along the four side surfaces.

Figure 26:
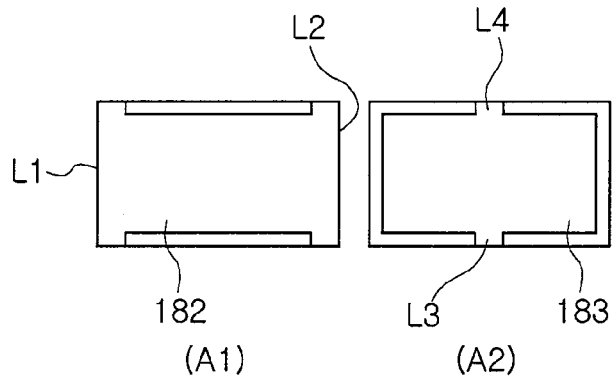
FIG. 26 is a plan view illustrating first and second inner connecting conductors applicable to the multilayer capacitor shown in FIG. 25.
Figure 27:
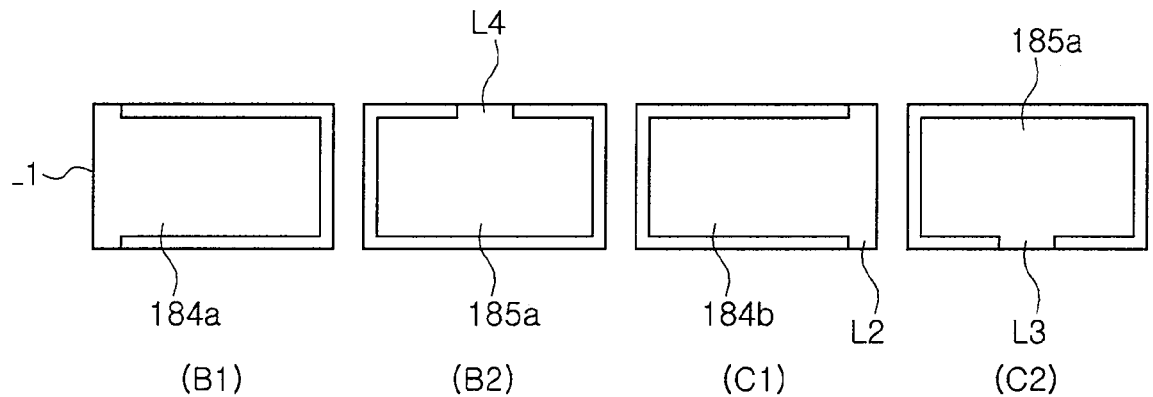
FIG. 27 is a plan view illustrating first and second inner electrodes applicable along with the first and second inner connecting conductors shown in FIG. 26.

To suit this arrangement of the outer electrodes, the multilayer capacitor 180 may include the first and second inner connecting conductors 182 and 183 shown in FIG. 26 and the first and second inner electrodes 184a, 184b; 185a, 185b shown in FIG. 27.

The first inner connecting conductor 182 is connected to the first outer electrodes 188a and 188b through two leads L1 and L2 extended to both of the side surfaces. Similarly, the second inner connecting conductor 183 is connected to the second outer electrodes 199a and 199b disposed on the first and second surfaces 181a and 181b through two leads L3 and L4, respectively.

The first and second inner electrodes 184a and 184b are connected to the first outer electrodes 188a and 188b through leads L1 and L2, respectively. The second inner electrodes 185a and 185b are connected to the second outer electrodes 189a and 189b through leads L3 and L4, respectively. This connection allows the first and second inner electrodes 184a, 184b; 185a, 185b to be electrically connected to the inner connecting conductors 182 and 183 of identical polarity, respectively.

In a case where the first surface 181a is a mounting surface and thus one pair of the first and second outer electrodes 188a and 189b and the first outer electrode 188b of the other pair are connected to power lines, the inner electrode 185a of group B2 connected to the second outer electrode 189b of the other pair is not connected to a terminal. Therefore, the second outer electrode 189b of the other pair may serve as an outer electrode for adjusting ESR, and when additionally connected to the power line, further reduces ESR.

As in the present embodiment, the outer electrodes are formed on the both surfaces such that the electrodes are easily connected to each other on the mounting surface.

Also, at least one of the outer electrodes may be formed on the first and second surfaces of the body and thus at least an additional one of the outer electrodes may be provided on one mounting surface in addition to the pair of first and second outer electrodes. This outer electrode may be utilized to adjust ESR. The ESR-adjusting outer electrode is the one connected to the inner electrode not connected to the outer electrode connected to the power line. This additional connection between the outer electrode and the power line further reduces ESR.

Also, in the present embodiment, the multilayer capacitor is designed to be horizontally symmetrical about the first and second surfaces. This configuration advantageously allows the mounting surface to be selected freely. Whichever surface is selected as a mounting surface, the inner electrodes and inner connecting conductor may be formed in a horizontal symmetry to ensure identical ESR and ESL characteristics.

Figure 28A:
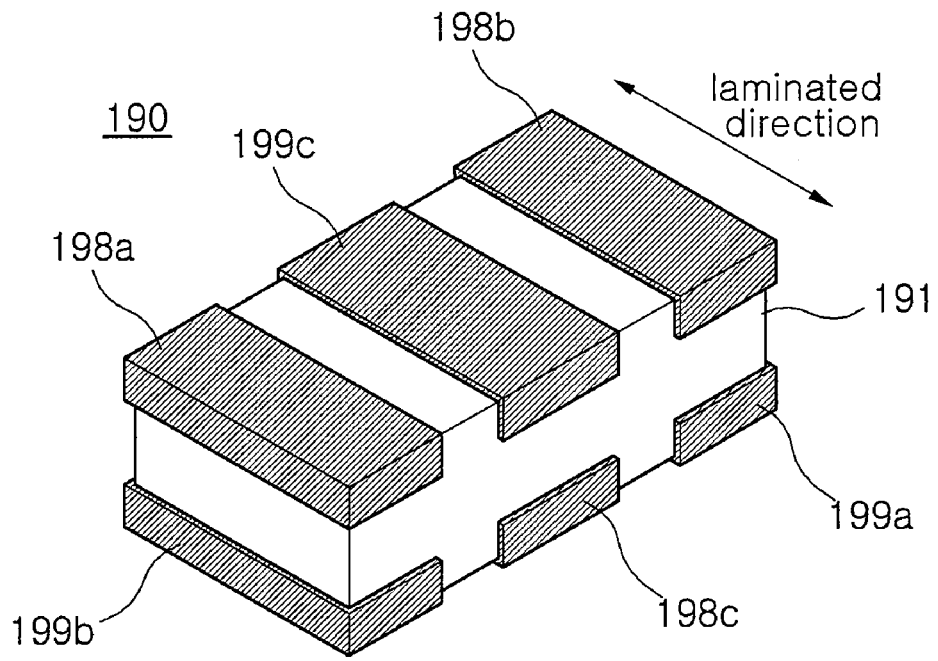
FIGS. 28A and 28B are perspective views illustrating a multilayer capacitor according to an exemplary embodiment of the invention, which is formed of a six-terminal structure having a laminated direction varied.
Figure 28B:
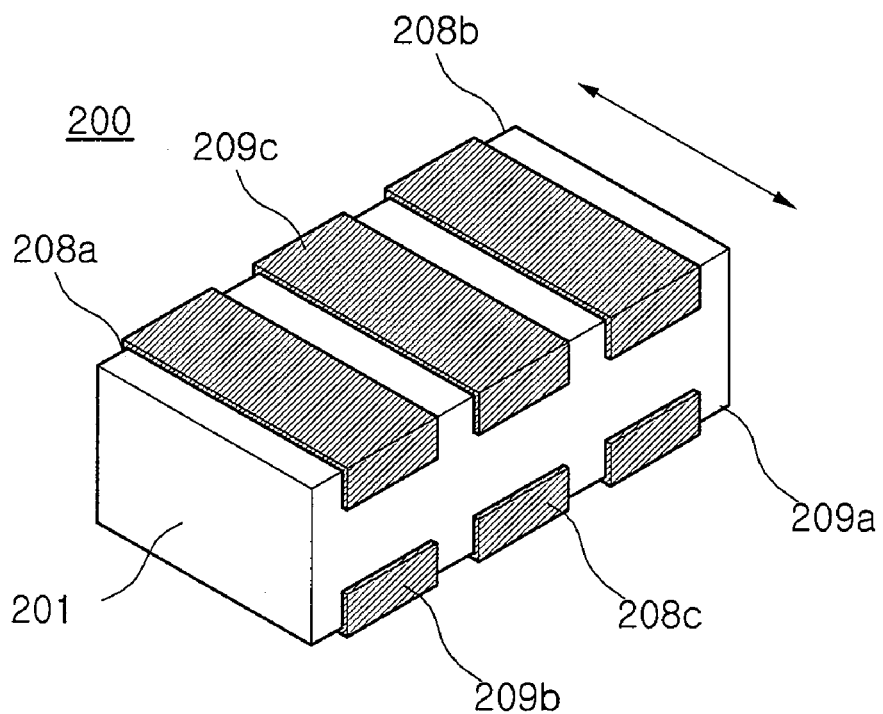

FIGS. 28A and 28B are perspective views illustrating a multilayer capacitor according to a seventh embodiment of the invention, which is formed of a six terminal structure having a laminated direction varied.

First, referring to FIG. 28A, the multilayer capacitor 190 includes a capacitor body 191 where a plurality of dielectric layers 191' are laminated. The capacitor body 191 includes opposing first and second surfaces formed in a laminated direction, and the first surface may provide a mounting surface.

The multilayer capacitor 190 of the present embodiment is formed of a six terminal structure including three first outer electrodes 198a, 198b, and 198c and three second outer electrodes 199a, 199b, and 199c.

FIG. 28B illustrates a multilayer capacitor 200 formed of a six terminal structure similar to FIG. 28A. Compared to FIG. 23A, out of the first and second outer electrodes 208a, 208b, and 208c; 209a, 209b, and 209c, the outer electrodes 208a, 208b, 209a, 209b formed on both edges are extended in a different manner. As described, the outer electrode structure applicable to the present invention may be varied as long as satisfying conditions in which one of the first and second surfaces provides a mounting surface.

Figure 29:
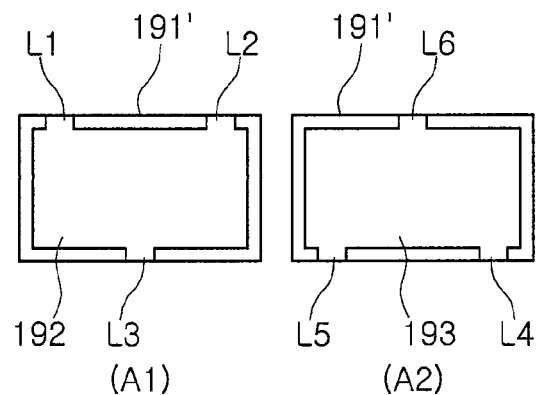
FIG. 29 is a plan view illustrating first and second inner connecting conductors applicable to the multilayer capacitor shown in FIGS. 28A and 28B, respectively.
Figure 30:
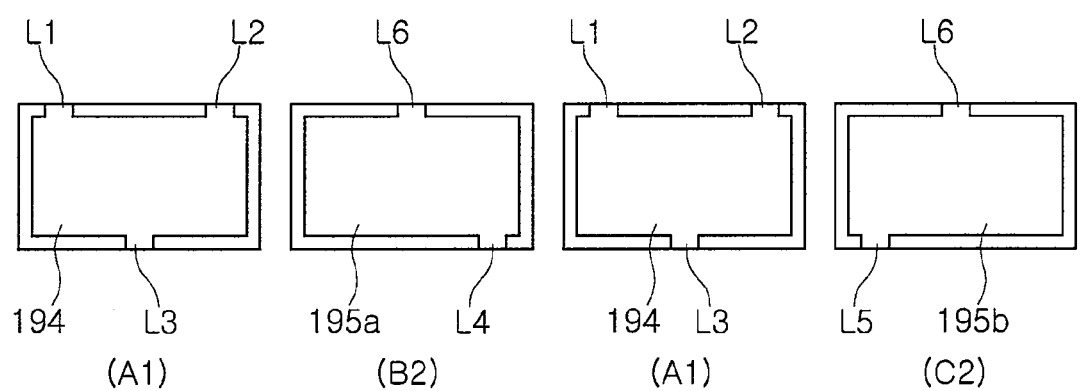
FIG. 30 is a plan view illustrating first and second inner electrodes applicable along with the first and second inner connecting conductors shown in FIG. 29.
Figure 30:
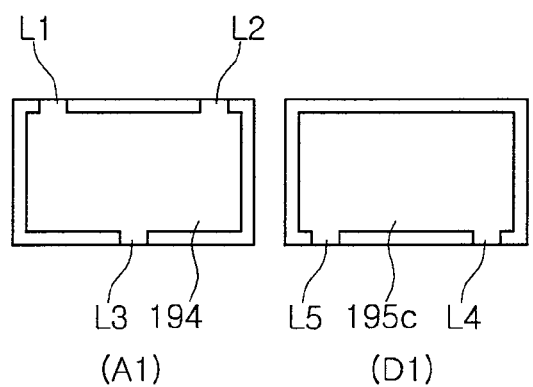

FIGS. 29 and 30 illustrate inner connecting conductors 192 and 193 and inner electrodes 194, 195a, 195b, and 195c applicable to the structures shown in FIGS. 28A and 28B. Here, the inner connecting conductors and the inner electrodes are formed of one pair, respectively but may be formed of a plurality of pairs and varied in order.

As shown in FIG. 29, the first inner connecting conductor 192 is connected to the first outer electrodes 198a and 198b formed on the second surface and the first outer electrode 198c formed on the first surface by three leads L1, L2, and L3, respectively. Similarly, the second inner connecting conductor 193 is connected to the second outer electrodes 199a and 199b formed on the first surface and the first outer electrode 199c formed on the second surface through three leads L4, L5, and L6, respectively.

Referring to FIG. 30, only second inner electrodes 195a, 195b, and 195c are divided into three groups, and first inner electrodes 194 pair with the second inner electrodes 195a, 195b, and 195c of the respective groups in a similar pattern to the first inner connecting conductors 194.

The first inner electrode 194 is all connected to the first outer electrodes 198a, 198b, and 198c by the three leads L1, L2, and L3 formed on the second surface. The second inner electrodes 195a, 195b, and 195c are connected to two of the second outer electrodes 199a, 199b, and 199c that are different from one another for each of the groups, by two of the leads L4, L5, and L6.

In this structure, when the first surface provides a mounting surface and a pair of first and second outer electrodes 198c and 199b are connected to power lines, the second inner electrode 195b of group C2 is not connected to the other first outer electrode 199a disposed on the first surface. Therefore, the first outer electrode 199a serves to adjust ESR and can be selectively connected to the power line to adjust ESR.

The multilayer capacitor of the present embodiment may be configured as at least eight or more terminals. Similarly to the present embodiment, as long as the outer electrodes formed on the first and second surfaces of the body are at least three in number, and at least one pair of the first and second outer electrodes are connected to the inner electrodes of the specific group capable of adjusting ESR, such configuration is beneficially applicable to a multilayer capacitor in which a surface formed in a laminated direction provides a mounting surface.

FIGS. 28A and 28B illustrate the multilayer capacitor employing only the inner connecting conductor (FIG. 29). However, the multilayer capacitor is a six or more terminal structure, and thus can be configured only with the inner electrodes without the inner connecting conductor (see FIGS. 11 and 12).

As set forth above, according to exemplary embodiments of the invention, in mounting a multilayer capacitor, outer electrodes are selectively connected to external power lines to vary ESR characteristics of the multilayer capacitor. Accordingly, a manufacturer can provide a multilayer capacitor capable of satisfying various ESR characteristics as a single chip. Also, a user can easily determine desired ESR characteristics easily only by connecting the outer electrodes with power lines.

While the present invention has been shown and described in connection with the exemplary embodiments, it will be apparent to those skilled in the art that modifications and variations can be made without departing from the spirit and scope of the invention as defined by the appended claims.

What is claimed is:

1. A multilayer capacitor comprising:
 a capacitor body having a plurality of dielectric layers laminated therein;
 a plurality of first and second inner electrodes alternately arranged to have different polarities opposing each other, while interposing a corresponding one of the dielectric layers, respectively;
 an inner connecting conductor of at least one polarity disposed adjacent to a corresponding one of the inner electrodes having opposite polarity, while interposing a corresponding one of the dielectric layers;
 a plurality of first and second outer electrodes formed on a surface of the body,
 wherein the inner connecting conductor is connected to a corresponding one of the outer electrodes having identical polarity,
 a corresponding one of the inner electrodes having identical polarity to the inner connecting conductor comprises a plurality of groups each including at least one of the inner electrodes,
 wherein the inner electrodes of the respective groups are connected to the outer electrodes having identical polarity that are different from one another for each of the groups and electrically connected to the inner connecting conductor through the connected outer electrode.

2. The multilayer capacitor of claim 1, wherein the inner connecting conductor of the at lest one polarity comprises at least one first and second inner connecting conductors,
 wherein each of the first and second inner electrodes comprises a plurality of groups each including at least one of the inner electrodes,
 wherein the first and second inner electrodes of each of the groups are connected to the first and second outer electrodes having identical polarity thereto, respectively and connected to the outer electrodes different from one another, the first and second inner electrodes of the each group electrically connected to the first and second inner connecting conductors through the connected outer electrodes, respectively.

3. The multilayer capacitor of claim 2, wherein out of the first and second outer electrodes, the outer electrode of at least one polarity is connected to a corresponding one of the inner connecting conductors having identical polarity and not connected to a corresponding one of the inner electrodes having identical polarity.

4. The multilayer capacitor of claim 2, wherein the first and second inner electrodes are connected to the outer electrodes of an identical number.

5. The multilayer capacitor of claim 2, wherein out of the first and second inner electrodes, the inner electrode of at least one polarity is connected to a plurality of corresponding ones of the outer electrodes having identical polarity.

6. The multilayer capacitor of claim 2, wherein the inner electrode of at least one of the groups is additionally connected to the outer electrode having the inner electrode of another one of the groups connected thereto.

7. The multilayer capacitor of claim 1, wherein the first and second outer electrodes are arranged to have different polarities adjacent to each other.

8. The multilayer capacitor of claim 7, wherein the first and second outer electrodes are formed on opposing side surfaces of the body, respectively, and
 the outer electrodes formed on the opposing side surfaces of the body comprise an identical number, respectively.

9. The multilayer capacitor of claim 8, wherein the first and second outer electrodes are arranged to have different polarities disposed on the opposing side surfaces, respectively.

10. The multilayer capacitor of claim 7, wherein the body is a rectangular parallelepiped structure comprising opposing first and second main surfaces and four side surfaces disposed therebetween,
 the first and second outer electrodes are formed along the four side surfaces and the outer electrodes are formed on the opposing side surfaces in an identical number, respectively.

11. The multilayer capacitor of claim 10, wherein the first and second outer electrodes are arranged to have different polarities disposed at corresponding positions on the opposing side surfaces, respectively.

12. The multilayer capacitor of claim 1, wherein the first and second inner connecting conductors have an overlapping area corresponding to an overlapping area between the first and second inner electrodes.

13. The multilayer capacitor of claim 1, wherein the capacitor body comprises first and second surfaces formed in a laminated direction of the plurality of dielectric layers to oppose each other, and side surfaces disposed therebetween, wherein one of the first and second surfaces provides a mounting surface, two of the plurality of first and second outer electrodes are formed on both opposing ones of the side surfaces formed in the laminated direction, respectively and at least another one of the outer electrodes is formed on the first and second surfaces, respectively, the outer electrodes formed on the one of the first and second surfaces as the mounting surface comprise the first and second outer electrodes formed of at least one pair with the outer electrodes formed on the side surfaces.

14. The multilayer capacitor of claim 1, wherein the capacitor body comprises first and second surfaces formed in a laminated direction of the plurality of dielectric layers to oppose each other, and side surfaces disposed therebetween, wherein one of the first and second surfaces provides a mounting surface, the plurality of first and second outer electrodes comprise three outer electrodes, respectively, and the outer electrodes of different polarities are formed on the first and second surfaces in an identical number, respectively.

15. A multilayer capacitor comprising:

a capacitor body having a plurality of dielectric layers laminated therein;

a plurality of first and second inner electrodes arranged alternately to have different polarities opposing each other, while interposing a corresponding one of the dielectric layers, respectively; and m number of first and second outer electrodes formed on a surface of the body, where $m \geq 3$, wherein the inner electrode of at least one polarity comprises a plurality of groups each including at least one of the inner electrodes, and the inner electrode of each of the groups is connected to n number of the outer electrodes, respectively, where $2 \leq n < m$, at least one of the outer electrodes connected to the inner electrode belonging to a respective one of the groups is different from the outer electrodes connected to the inner electrode belonging to another one of the groups, and the inner electrode of one of the groups is commonly connected to the outer electrodes connected to the inner electrode of another one of the groups such that the inner electrodes of all of the groups are electrically connected to one another.

16. The multilayer capacitor of claim 15, wherein the inner electrode of the at least one polarity comprises the first and second inner electrodes, the first and second inner electrodes comprise a plurality of groups each including at least one of the inner electrodes and the inner electrodes of the each group are connected to the n number of outer electrodes having identical polarity thereto, respectively, where $2 \leq n < m$, in the inner electrode of each polarity, at least one of the outer electrodes connected to the inner electrode belonging to a respective one of the groups is different from the outer electrodes connected to the inner electrode of another one of the groups, and the inner electrode of one of the groups is commonly connected to the outer electrodes connected to the inner electrode of another one of the groups such that the inner electrodes of all of the groups are electrically connected to one another.

* * * * *